US012609091B2

(12) United States Patent
Gamm

(10) Patent No.: US 12,609,091 B2
(45) Date of Patent: Apr. 21, 2026

(54) METHODS AND SYSTEMS FOR GRAY COMPONENT REPLACEMENT IN COLOR ELECTROPHORETIC DISPLAY DEVICES

(71) Applicant: E INK CORPORATION, Billerica, MA (US)

(72) Inventor: Brian Gamm, North Billerica, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 19/188,231

(22) Filed: Apr. 24, 2025

(65) Prior Publication Data

US 2025/0356813 A1 Nov. 20, 2025

Related U.S. Application Data

(60) Provisional application No. 63/647,294, filed on May 14, 2024.

(51) Int. Cl.
*G09G 3/34* (2006.01)
*G09G 3/20* (2006.01)

(52) U.S. Cl.
CPC ........... *G09G 3/344* (2013.01); *G09G 3/2044* (2013.01); *G09G 2320/066* (2013.01); *G09G 2320/0666* (2013.01); *G09G 2340/06* (2013.01)

(58) Field of Classification Search
None
See application file for complete search history.

(56) References Cited

U.S. PATENT DOCUMENTS

| | | | |
|---|---|---|---|
| 7,778,460 | B2 | 8/2010 | Park et al. |
| 7,973,971 | B1 | 7/2011 | Borg |
| 8,422,103 | B2 | 4/2013 | Qiao et al. |
| 9,514,691 | B2 | 12/2016 | Reeves |
| 10,638,019 | B2 | 4/2020 | Shaham et al. |
| 11,978,412 | B2 | 5/2024 | French et al. |
| 2011/0285713 | A1 | 11/2011 | Swic et al. |
| 2021/0358452 | A1 | 11/2021 | Crounse |
| 2022/0180824 | A1 | 6/2022 | Asano et al. |

OTHER PUBLICATIONS

Thyssen, Anthony, "Color Modifications—IM v6 Examples", URL: https://usage.imagemagick.org/color_mods/, XP055297096, Oct. 6, 2011.

European Patent Office, "International Search Report and Written Opinion", PCT/US2025/026163, Jul. 7, 2025.

*Primary Examiner* — Aneeta Yodichkas
(74) *Attorney, Agent, or Firm* — Rajesh Vallabh

(57) ABSTRACT

A driving method for a color electrophoretic display includes receiving an RGB input color image; mapping the RGB color image to an electrophoretic destination space defined by an electrophoretic color gamut to generate a color destination space image; dithering the color destination space image to generate a dithered color image; identifying neutral portions of the dithered color image; converting the RGB color image to a black and white image; mapping the black and white image to a black and white electrophoretic destination space to generate a black and white destination space image; dithering the black and white destination space image to generate a dithered black and white image; merging the dithered color image and the dithered black and white image by replacing neutral portions of the dithered color image with corresponding portions of the dithered black and white image to generate a merged color image; and displaying the merged image.

19 Claims, 22 Drawing Sheets
(13 of 22 Drawing Sheet(s) Filed in Color)

```
function [ColorOut, BWOut] = LikelihoodColorCurve(RhoT,ImageRGBRatio)

    % remove possibility for NaNs
    xTest = 0.9999*( ImageRGBRatio +0.0001)/(1.0001);

    % create a sequence of x-values as the input to the sigmoid
    x = linspace(-(100- RhoT),10,(10+(100-RhoT))*10);

    % define the sigmoid
    sigmoid = @(x)1./(1+exp(-x/1.5));
    y = sigmoid(x);

    % flip the sigmoid along the x-direction
    y = fliplr(y);

    % the sigmoid covers only a small portion of the x-space.
    % Fill the rest with ones
    oneSet = ones(1,1+( RhoT-10)*10);
    y2 = [oneSet y];

    % define the BW curve and Color Curve y-values
    BWcurve = 1-y2;
    ColorCurve = y2;

    % calculate the pixel values using linear interpolation
    % for the color and BW curves
    ColorOut = interp1(0:.001:1, ColorCurve, ImageRGBRatio);
    BWOut = interp1(0:.001:1, BWcurve, ImageRGBRatio);

end
```

FIG. 15

METHODS AND SYSTEMS FOR GRAY COMPONENT REPLACEMENT IN COLOR ELECTROPHORETIC DISPLAY DEVICES

CROSS REFERENCE TO RELATED APPLICATION(S)

This application claims priority from U.S. Provisional Patent Application No. 63/647,294 filed on May 14, 2024 entitled METHODS AND SYSTEMS FOR GRAY COMPONENT REPLACEMENT IN COLOR ELECTROPHORETIC DISPLAY DEVICES, which is hereby incorporated by reference in its entirety.

BACKGROUND

The present invention generally relates to transforming input image files (typically a red-green-blue (RGB) image file including, but not limited to, a standard RGB (sRGB) image file, an Adobe RGB image file, or an Apple RGB image file) to files that can be displayed on color electrophoretic display devices. More particularly, the invention relates to gray component replacement (GCR) in images to be displayed on color electrophoretic display devices.

An electrophoretic display changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the electrophoretic displays provide a book-like reading experience, use little power, and allow a user to carry a library of hundreds of books in a lightweight handheld device.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, e.g., the text to a book.

More recently, a variety of color option have become commercially available for electrophoretic displays, including three-color displays (black, white, red; black white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP®) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP®, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. patents, all of which are incorporated by reference in their entireties: U.S. Pat. Nos. 9,361,836, 9,921,451, 10,276,109, 10,353,266, 10,467,984, and 10,593,272.

This invention relates to color electrophoretic displays capable of rendering more than two colors using a single layer of electrophoretic material comprising a plurality of colored particles, e.g., white, cyan, yellow, and magenta particles. In some instances, two of the particles will be positively-charged, and two particles will be negatively-charged. In some instances, three of the particles will be positively-charged, and one particle will be negatively-charged. In some instances, one positively-charged particle will have a thick polymer shell and one negatively-charged particle has a thick polymer shell.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, e.g., the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, e.g., at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, e.g., Kitamura, T., et al., Electrical toner movement for electronic paper-like display, IDW Japan, 2001, Paper HCS1-1, and Yamaguchi, Y., et al., Toner display using insulative particles charged triboelectrically, ID W Japan, 2001, Paper AM D4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, e.g., in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see, e.g., U.S. Pat. No. 7,002,728;

(b) Capsules, binders and encapsulation processes; see, e.g., U.S. Pat. Nos. 6,922,276 and 7,411,719;

(c) Microcell structures, wall materials, and methods of forming microcells; see, e.g., U.S. Pat. Nos. 7,072,095 and 9,279,906;

(d) Methods for filling and sealing microcells; see, e.g., U.S. Pat. No. 7,715,088 and U.S. Patent Application Publication No. 2002/0188053;

(e) Films and sub-assemblies containing electro-optic materials; see, e.g., U.S. Pat. Nos. 6,982,178 and 7,839,564;

(f) Backplanes, adhesive layers and other auxiliary layers and methods used in displays; see, e.g., U.S. Pat. Nos. 7,116,318 and 7,535,624;

(g) Color formation and color adjustment; see, e.g., U.S. Pat. Nos. 7,075,502 and 7,839,564;

(h) Methods for driving displays; see, e.g., U.S. Pat. Nos. 7,012,600 and 7,453,445;

(i) Applications of displays; see, e.g., U.S. Pat. Nos. 7,312,784 and 8,009,348; and (j) Non-electrophoretic displays, as described in U.S. Pat. No. 6,241,921 and U.S. Patent Applications Publication No. 2015/0277160; and applications of encapsulation and microcell technology other than displays; see, e.g., U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see, e.g., U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, e.g., U.S. Pat. Nos. 6,672,921 and 6,788,449.

Although electrophoretic media are often opaque (since, e.g., in many electrophoretic media, the particles substantially block transmission of visible light through the display) and operate in a reflective mode, many electrophoretic displays can be made to operate in a so-called shutter mode in which one display state is substantially opaque and one is light-transmissive. See, e.g., U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (U se of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

A commonly used system for quantifying the color characteristics of a display, including both brightness and hue is the CIELAB system, which assigns color coordinate values (i.e., L*, a*, b*) corresponding to colors displayed by typical color reflective display devices under a CIE standard illuminant D65 (e.g., with color temperature 6500K). L* represents lightness from black to white on a scale of zero to 100, while a* and b* represent chromaticity with no specific numeric limits. Negative a* corresponds with green, positive a* corresponds with red, negative b* corresponds with blue and positive b* corresponds with yellow. L* can be converted to reflectance with the following formula: $L^*=116(Y/Y_0)^{1/3}-16$ where Y is the luminance and $Y_0$ is the standard luminance value.

U.S. Pat. Nos. 8,576,476 and 8,797,634 describe multicolor electrophoretic displays having a single back plane comprising independently addressable pixel electrodes and a common, light-transmissive front electrode. The common, light-transmissive front electrode is also known as the top electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (e.g., caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below, that is capable of achieving at least eight independent colors (white, red, green, blue, cyan, yellow, magenta, and black). As has been described previously, the gamut (color space) that results from electrophoretic display systems, such as Advanced Color electronic Paper can be variable depending upon environmental conditions and the chosen driving waveforms. See, e.g., U.S. Pat. No. 10,467,984, which is incorporated by reference in its entirety.

SUMMARY

According to a first aspect of the invention, a method is provided for driving a color electrophoretic display. The method includes the steps of: (a) receiving an RGB input color image; (b) mapping the RGB input color image to an electrophoretic destination space defined by an electrophoretic color gamut to generate a color destination space image; (c) dithering the color destination space image to generate a dithered color image; (d) identifying neutral portions of the dithered color image; (e) converting the RGB input color image to a black and white image; (f) mapping the black and white image to a black and white electrophoretic destination space to generate a black and white destination space image; (g) dithering the black and white destination space image to generate a dithered black and white image; (h) merging the dithered color image and the dithered black and white image by replacing the neutral portions of the dithered color image with corresponding portions of the dithered black and white image to generate a merged color image; and (i) displaying the merged color image on the electrophoretic display.

According to another aspect of the invention, a color display device includes an electrophoretic display comprising a light-transmissive electrode, an active matrix of pixel electrodes, and an electrophoretic medium comprising multiple types of electrophoretic particles having different optical properties disposed between the light-transmissive electrode and the active matrix of pixel electrodes. The electrophoretic display is capable of producing a plurality of primary colors at each pixel electrode. The color display device also includes a processor and a controller coupled to the processor. The controller is configured to provide electrophoretic display pixel color instructions to the active matrix of pixel electrodes. The electrophoretic display also includes a non-transitory memory coupled to the processor having a program stored therein containing a plurality of instructions which, when executed by the processor, cause the processor to: (a) receive an RGB input color image; (b) map the RGB input color image to an electrophoretic destination space defined by an electrophoretic color gamut to generate a color destination space image; (c) dither the color destination space image to generate a dithered color image; (d) identify neutral portions of the dithered color image; (e) convert the RGB input color image to a black and white image; (f) map the black and white image to a black and white electrophoretic destination space to generate a black and white destination space image; (g) dither the black and white destination space image to generate a dithered black and white image; (h) merge the dithered color image and the dithered black and white image by replacing the neutral portions of the dithered color image with corresponding portions of the dithered black and white image to generate a merged color image; and (i) instruct the controller to cause the electrophoretic medium to display the merged color image.

In one or more embodiments, the black and white electrophoretic destination space is defined by black, white, and a plurality of gray colors.

In one or more embodiments, sigmoidal contrast enhancement of the black and white destination space image is performed in step (f) to compensate for reduced dynamic range.

In one or more embodiments, the color destination space image and the black and white destination space image are dithered using a threshold mask or a dither mask, which may include blue-noise masks, Bayer masks, or similar masks used for dithering.

In one or more embodiments, the RGB input color image is converted to the black and white image using weighted additions of red, green, and blue channels of the RGB input color image.

In one or more embodiments, the neutral portions of the dithered color image are identified by calculating a degree of neutrality for each pixel in the dithered color image and determining whether the degree of neutrality for each pixel meets a given threshold.

In one or more embodiments, the degree of neutrality for each pixel in the dithered color image is calculated using an RGB ratio method, a neighborhood RGB ratio method, or a uniform color space chroma method.

In one or more embodiments, the RGB ratio method comprises calculating an RGB ratio metric value for each pixel of the color image, and comparing the RGB ratio metric value to a threshold to identify neutral portions of the color image.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 15 shows a function to indicate the likelihood a pixel will be classified as black and white.

DETAILED DESCRIPTION

The present invention generally relates to transforming input image files (typically RGB files) to files that can be displayed on color electrophoretic display devices. More particularly, the invention relates to gray component replacement in images to render fine neutral details, such as black and gray lines and text, using only neutral primaries with lower contrast between groups of dithered primaries. This makes dithering patterns less visible and makes black and white regions appear smoother, increasing the resolution of fine details.

Electrophoretic display devices may be constructed using an electrophoretic fluid in several ways that are known in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 1:
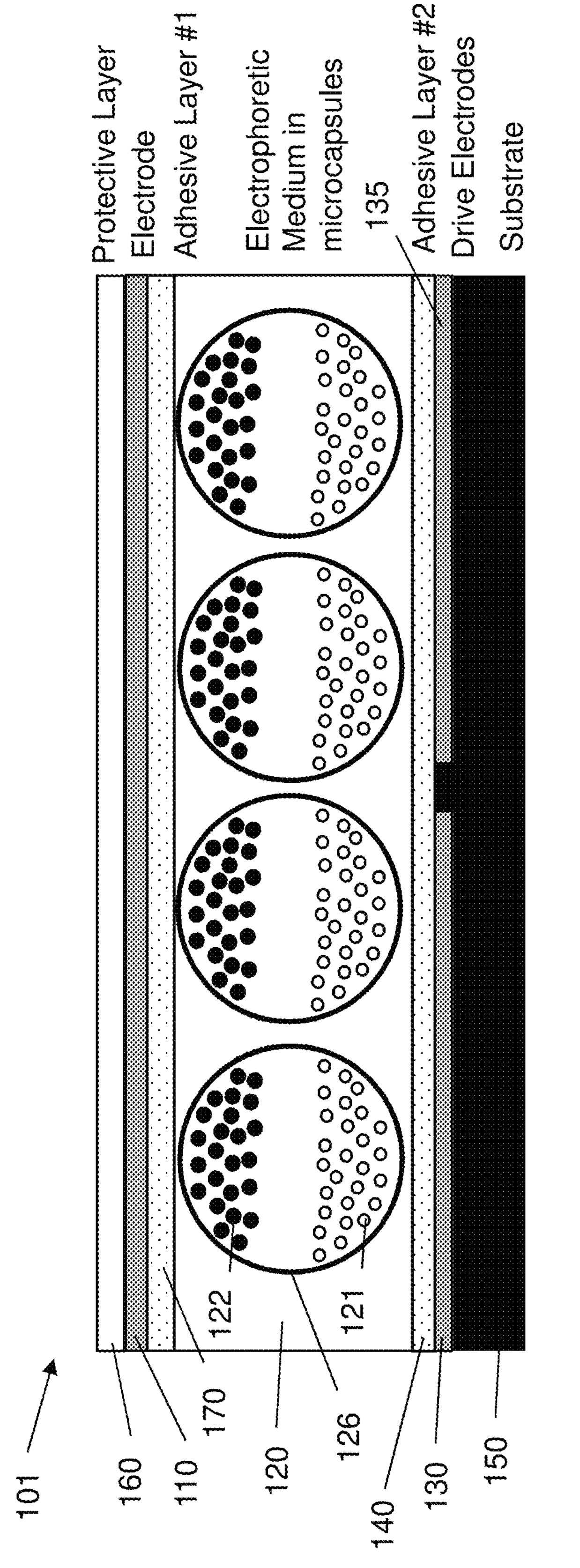
FIG. 1 is a schematic cross-section showing an embodiment of an encapsulated electrophoretic display suitable for use with the methods of the invention.
Figure 2:
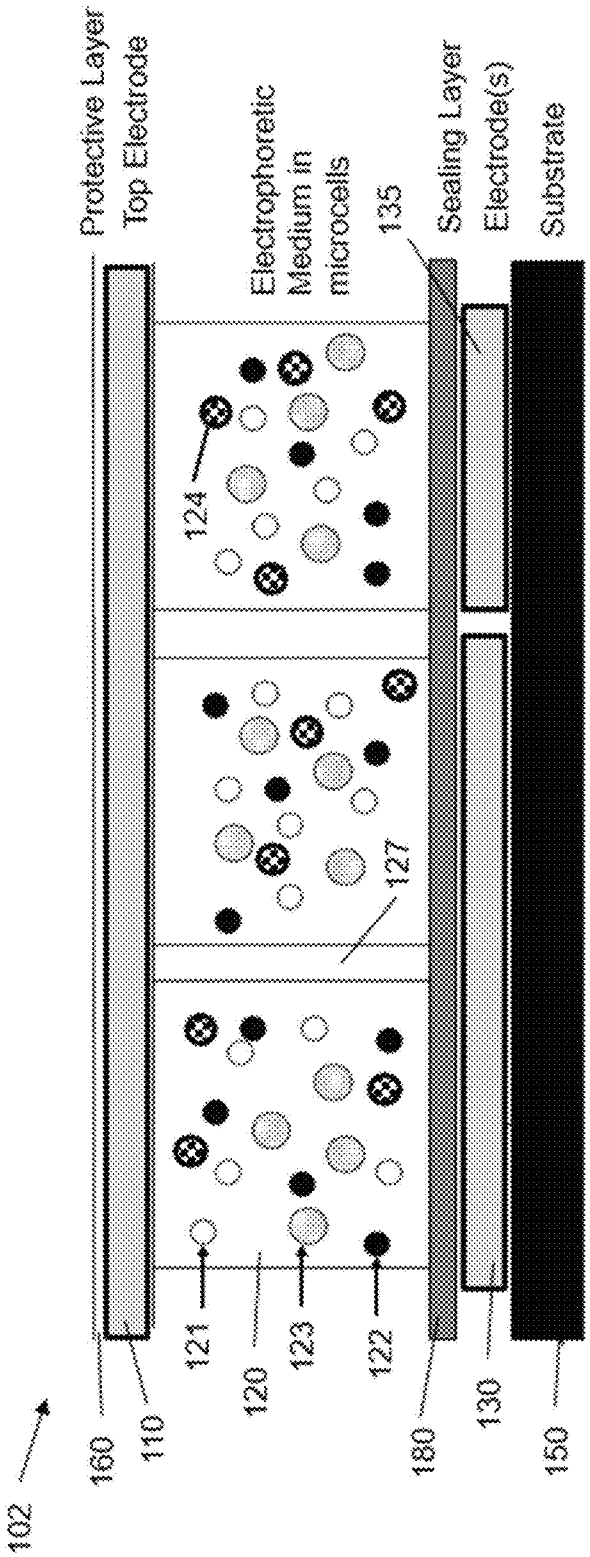
FIG. 2 is a schematic cross-section showing an embodiment of an encapsulated electrophoretic display suitable for use with the methods of the invention.

FIGS. 1 and 2 show electrophoretic displays 101, 102 including a top light-transmissive electrode 110, an electrophoretic medium 120, and bottom drive electrodes 130, 135, which are often pixel electrodes of an active matrix of pixels controlled with thin film transistors (TFT). Alternatively, bottom drive electrodes 130, 135 may be directly wired to a controller or some other switch that provides voltage to the bottom drive electrodes 130, 135 to effect a change in the optical state of the electrophoretic medium 120, i.e., segmented electrodes. Importantly, it is not necessary that a junction between drive electrodes 130, 135 corresponds with an intersection of microcapsules or with a wall 127 of a microcell. Because the electrophoretic medium 120 is sufficiently thin, and the capsules or microcells sufficiently wide, the pattern of the drive electrodes (square, circles, hexagons, wavy, text, or otherwise) will show when the display is viewed from the viewing surface; not the pattern of the containers. The electrophoretic medium 120 contains at least one type of electrophoretic particle 121, however a second type of electrophoretic particle 122, or a third type of electrophoretic particle 123, a fourth type of electrophoretic particle 124, or more types of particles is feasible. (It should be noted that third electrophoretic particles 123 and fourth electrophoretic particles 124 can be included within the microcapsules 126 of FIG. 1, but have been omitted for ease of illustration.) The electrophoretic medium 120 typically includes a solvent, such as isoparaffins, and may also include dispersed polymers and charge control agents to facilitate state stability, e.g. bistability, i.e., the ability to maintain an electro-optic state without inputting any additional energy.

The electrophoretic medium 120 is typically compartmentalized such as by a microcapsule 126 (FIG. 1) or the walls of a microcell 127 (FIG. 2). The entire display stack is typically disposed on a substrate 150, which may be rigid or flexible. The displays 101, 102 typically also include a protective layer 160, which may simply protect the top electrode 110 from damage, or it may envelop the entire displays 101, 102 to prevent ingress of water, etc. Electrophoretic displays 101, 102 may also include one or more adhesive layers 140, 170, and/or sealing layers 180 as needed. In some embodiments, an adhesive layer may include a primer component to improve adhesion to the electrode layer 110, or a separate primer layer (not shown in FIG. 1 or 2) may be used. (The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

Thin-film-transistor (TFT) backplanes usually have only one transistor per pixel electrode or propulsion electrode. Conventionally, each pixel electrode has associated therewith a capacitor electrode such that the pixel electrode and the capacitor electrode form a capacitor; see, e.g., International Patent Application WO2001007961. In some embodiments, N-type semiconductor (e.g., amorphous silicon) may be used to form the transistors and the "select" and "non-select" voltages applied to the gate electrodes can be positive and negative, respectively.

Figure 3A:
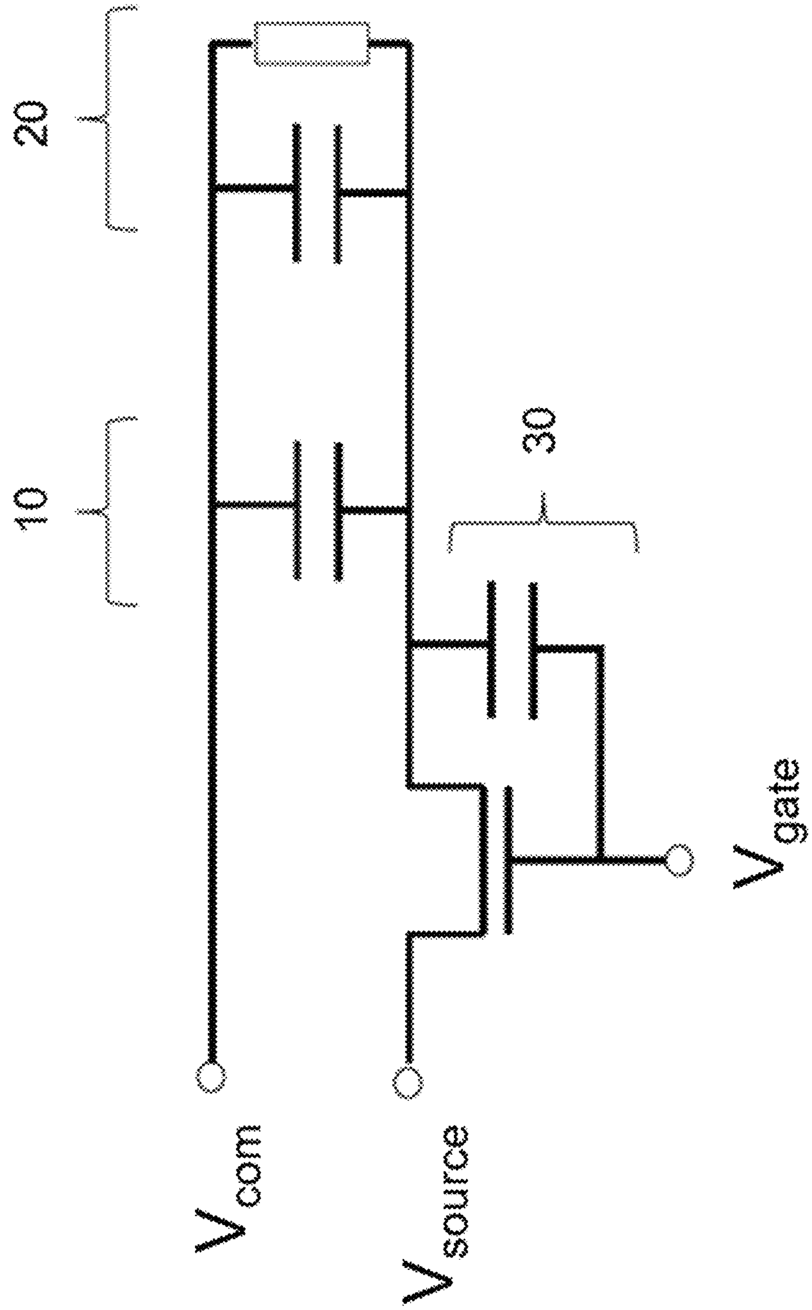
FIG. 3A illustrates an exemplary equivalent circuit of a single pixel of an electrophoretic display wherein the voltage on the single pixel is controlled with a transistor. The circuit of FIG. 3A is commonly used in active matrix backplanes.

FIG. 3A depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.

Figure 3B:
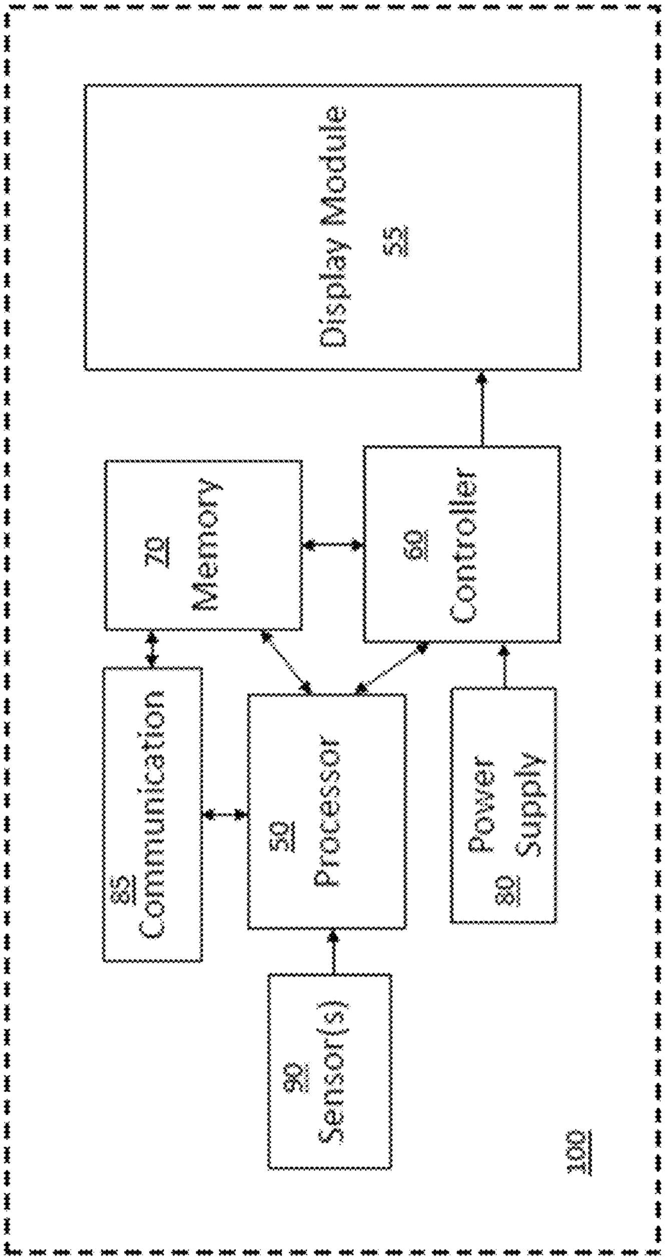
FIG. 3B illustrates an exemplary color display including a display module that can be any electro-optic display module, but is preferably a color electrophoretic display module. The color display also includes a processor, memory, one or more power supplies, and a controller.

Typically, the transistors are arranged in a matrix having gate and signal lines to each transistor, as well as a drain electrode typically coupled to a pixel electrode. This active matrix backplane is coupled to the electrophoretic medium, e.g., as illustrated in FIGS. 1 and 2, and typically sealed to create a display module 55, as depicted in FIG. 3B. Such a display module 55 becomes the focus of a color display 100. The color display 100 will typically include a processor 50, which is configured to coordinate the many functions relating to displaying content on the display module 55, and to transform "standard" images, such as RGB images to a color regime that best duplicates the image on the display module 55. The processor 50 is typically a mobile processor chip, such as made by Freescale or Qualcomm, although other manufacturers are known. The processor 50 is in frequent communication with a non-transitory memory 70, from which it pulls image files and/or look up tables to perform the color image transformations described below. The color display 100 may have more than one non-transitory memory chip. The memory 70 may be flash memory. Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The color display 100 may additionally include a communication module 85, which may implement one or more communications protocols, e.g., WIFI protocols or BLUETOOTH, and allows the color display 100 to receive images and instructions, which also may be stored in the memory 70. The color display 100 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the color display 100 can be implemented in a singular integrated circuit. For example, a specialized integrated circuit may fulfill the functions of the processor 50 and the controller 60.

Figure 4:
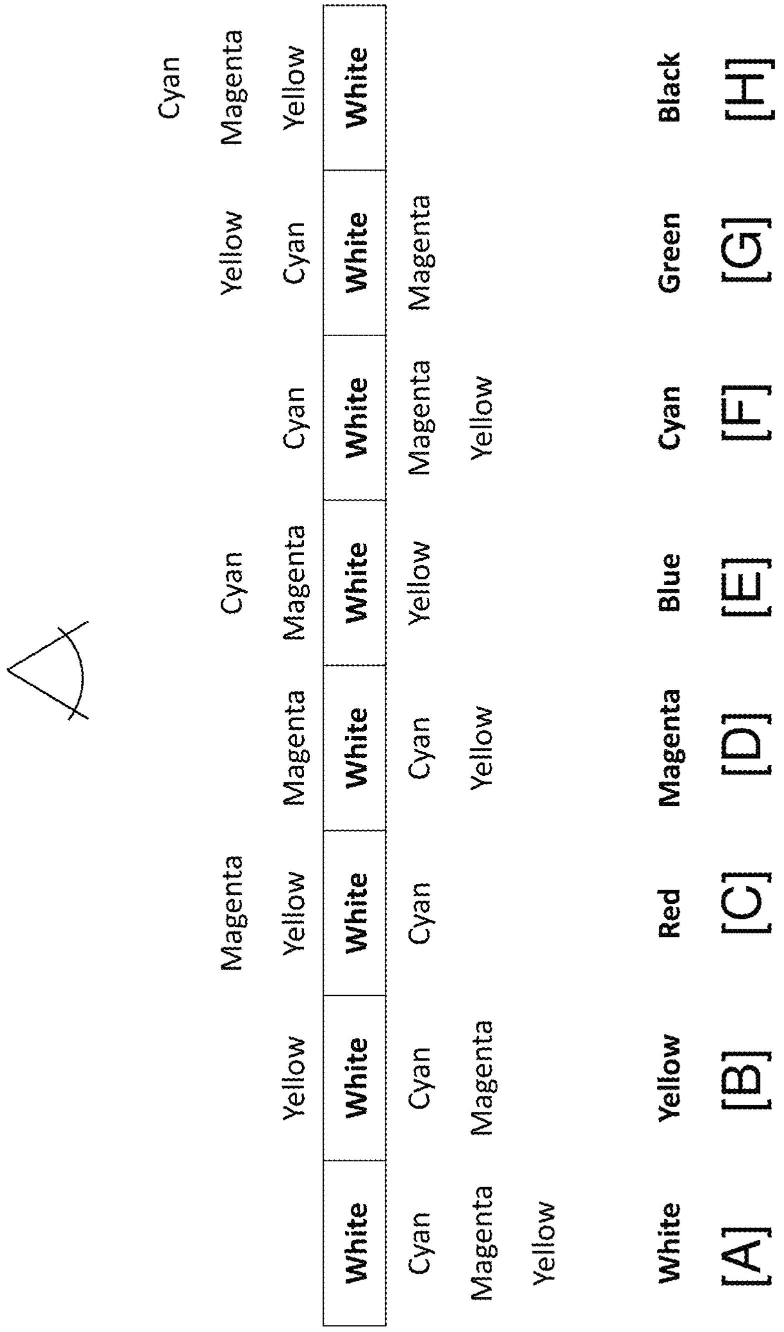
FIG. 4 is a schematic cross-section showing the positions of the various colored particles in a colored electrophoretic medium when displaying black, white, three subtractive primary colors and three additive primary colors.

In the instance of ACeP®, each of the eight principal colors (red, green, blue, cyan magenta, yellow, black and white) corresponds to a different arrangement of the four pigments, such that the viewer only sees those colored pigments that are on the viewing side of the white pigment (i.e., the only pigment that scatters light). More specifically, when the cyan, magenta and yellow particles lie below the white particles (Situation [A] in FIG. 4), there are no particles above the white particles and the pixel simply displays a white color. When a single particle is above the white particles, the color of that single particle is displayed, yellow, magenta and cyan in Situations [B], [D], and [F] respectively in FIG. 4. When two particles lie above the white particles, the color displayed is a combination of those of these two particles; in FIG. 4, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 4), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black). It would not be easy to render the color black if more than one type of colored particle scattered light.

Figure 5:
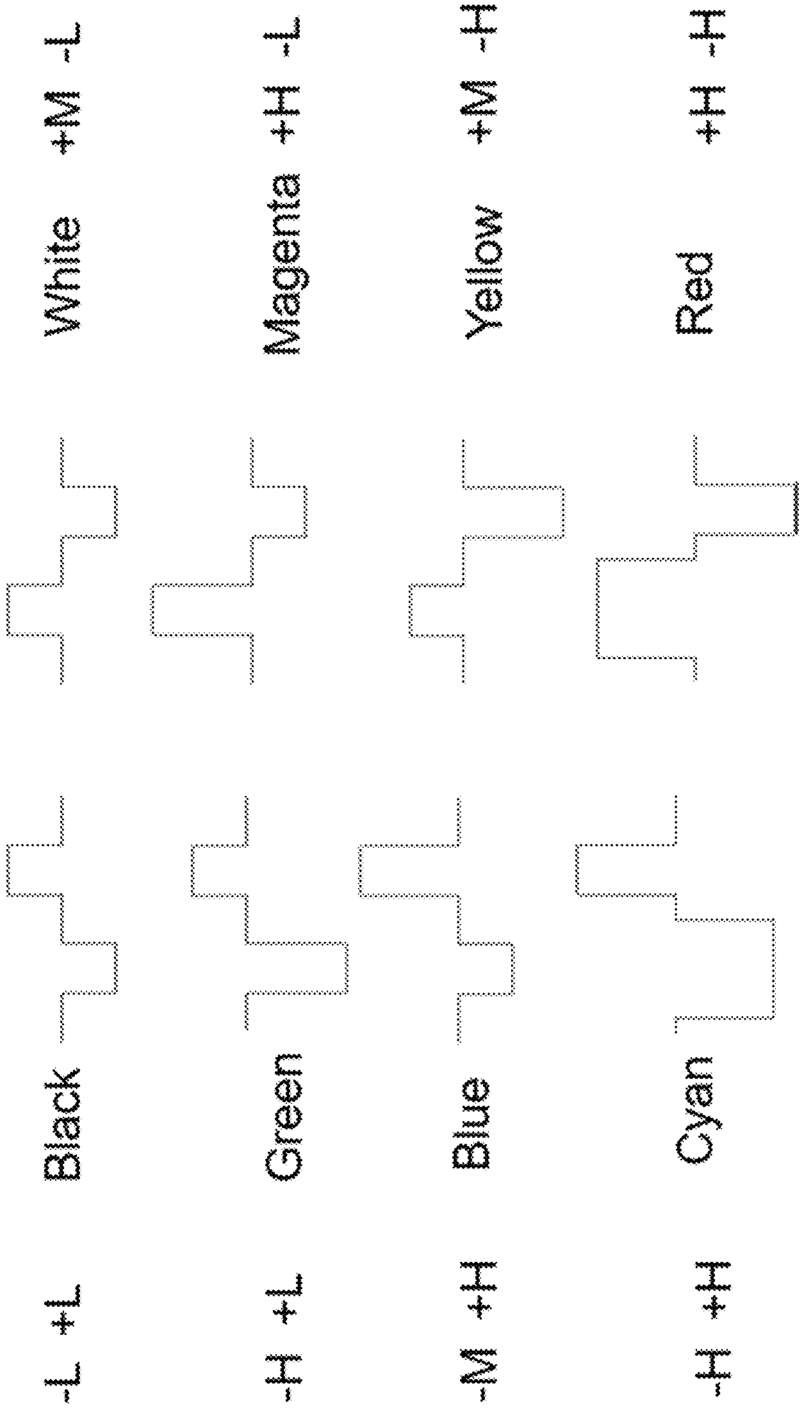
FIG. 5 shows exemplary push-pull drive schemes for addressing an electrophoretic medium including three subtractive particles and a scattering (white) particle.

It has been found that waveforms to sort the four pigments into appropriate configurations to make these colors are best achieved with at least seven voltage levels (high positive, medium positive, low positive, zero, low negative, medium negative, high negative). FIG. 5 shows typical waveforms (in simplified form) used to drive a four-particle color electrophoretic display system described above. Such waveforms have a "push-pull" structure: i.e., they consist of a dipole comprising two pulses of opposite polarity. The magnitudes and lengths of these pulses determine the color obtained. In general, the higher the magnitude of the "high" voltages, the better the color gamut achieved by the display. The "high" voltage is typically between 20V and 30V, more typically around 25V, e.g., 24V. The "medium" (M) level is typically between 10V and 20V, more typically around 15V, e.g., 15V or 12V. The "low" (L) level is typically between 3V and 10V, more typically around 7V, e.g., 9V or 5V. Of course, the values for H, M, L will depend somewhat on the composition of the particles, as well as the environment of the electrophoretic medium. In some applications, H, M, L may be set by the cost of the components for producing and controlling these voltage levels.

As shown in FIG. 5, if the top electrode is held at a constant voltage (i.e., not top plane switched), even "simple" waveforms for the ACeP® system require that the driving electronics provide seven different voltages to the data lines during the update of a selected pixel of the display (+H, +M, +L, 0, −L, −M, −H). While multi-level source drivers capable of delivering seven different voltages are available, most commercially-available source drivers for electrophoretic displays permit only three different voltages to be delivered during a single frame (typically a positive voltage, zero, and a negative voltage).

Of course, achieving the desired color with the driving pulses of FIG. 5 is contingent on the particles starting the process from a known state, which is unlikely to be the last color displayed on the pixel. Accordingly, a series of reset pulses precede the driving pulses, which increases the amount of time required to update a pixel from a first color to a second color. The reset pulses are described in greater detail in U.S. Pat. No. 10,593,272, incorporated by reference. The lengths of these pulses (refresh and address) and of any rests (i.e., periods of zero voltage between them may be chosen so that the entire waveform (i.e., the integral of voltage with respect to time over the whole waveform) is DC balanced (i.e., the integral of voltage over time is substantially zero). DC balance can be achieved by adjusting the lengths of the pulses and rests in the reset phase so that the net impulse supplied in the reset phase is equal in magnitude and opposite in sign to the net impulse supplied in the address phase, during which phase the display is switched to a particular desired color.

While modifying the rail voltages provides some flexibility in achieving differing electro-optical performance from a four-particle electrophoretic system, there are many limitations introduced by top-plane switching. For example, it is typically preferred, in order to make a white state with displays of the present invention, that the lower negative voltage $V_{M-}$ is less than half the maximum negative voltage $V_{H-}$.

An alternative solution to the complications of top-plane switching can be provided by fabricating the control transistors from less-common materials that have a higher electron mobility, thereby allowing the transistors to switch larger control voltages, e.g., +/−30V, directly. Newly-developed active matrix backplanes may include thin film transistors incorporating metal oxide materials, such as tungsten oxide, tin oxide, indium oxide, and zinc oxide. In these applications, a channel formation region is formed for each transistor using such metal oxide materials, allowing faster switching of higher voltages. Such transistors typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Such backplanes are available from manufacturers such as Sharp/Foxconn, LG, and BOE.

One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30V via a suitable display driver. Furthermore, a source driver capable of supplying at least five, and preferably seven levels provides a different driving paradigm for a four-particle electrophoretic display system. In an embodiment, there will be two positive voltages, two negative voltages, and zero volts. In another embodiment, there will be three positive voltages, three negative voltages, and zero volts. In an embodiment, there will be four positive voltages, four negative voltages, and zero volts. These levels may be chosen within the range of about −27V to +27V, without the limitations imposed by top plane switching as described above.

Using advanced backplanes, such as metal oxide backplanes, it is possible to directly address each pixel with a suitable push-pull waveform, i.e., as described in FIG. 5. This greatly reduces the time required to update each pixel, in some instances transforming a six-second update to less than one second. While, in some cases, it may be necessary to use reset pulses to establish a starting point for addressing, the reset can be done quicker at higher voltages. Additionally, in four-color electrophoretic displays having reduced color sets, it is possible to directly drive from a first color to a second color with a specific waveform that is only slightly longer than the push-pull waveforms shown in FIG. 5.

The bulk of electronic color images in the world are formatted in a red-green-blue (RGB) color space, corresponding to the red, green, and blue subpixels that are commonly used in liquid crystal displays (LCD), light emitting diode (LED) displays, or cathode ray tube (CRT) displays. A common format is an 8-bit RGB that assigns red, green, and blue subpixel values to each pixel in the image as a set of three numbers, each number spanning from 0-255. Accordingly, a standard RGB image file consists of a set of numbers corresponding to pixels in the image. When those color levels are provided to the assigned pixels, the image appears on the display. The next image file, corresponding to a new photograph or a next frame of a video, has a new set of numbers at each pixel.

The RGB values do not map directly into the color space used with electrophoretic displays. The shape of the RGB gamut is different from the shape of an electrophoretic device gamut, e.g., an ACeP® gamut. Thus, it is necessary to transform the RGB image files to an electrophoretic file format. Methods of mapping RGB image files to electrophoretic image files like ACeP® files are known in the art including, e.g., as described in U.S. Pat. No. 11,984,088, which is incorporated by reference herein in its entirety. U.S. Pat. No. 11,984,088 describes transforming RGB image data to image data for the ACeP® gamut. The process includes mapping the RGB source space into the ACeP® device space using a tetrahedral decomposition of the RGB source space.

After the mapping process, the image set can be dithered in the electrophoretic device color space in order to produce a greater number of perceived colors using a limited set of color primaries (typically red, green, blue, cyan, yellow, magenta, white, and black). Dithering creates the illusion of color depth in images with the limited color palette. Colors not available in the palette are approximated by a diffusion of colored pixels from within the available palette. When a dithered image is viewed at a sufficient distance, the individual colored pixels are merged by the human visual system into perceived uniform colors. Because of the trade-off between color depth and spatial resolution, dithered images when viewed closely have a characteristic graininess as compared to images in which the color palette available at each pixel location has the same depth as that required to render images on the display as a whole. Standard dithering algorithms such as threshold mask dithering and error diffusion algorithms (in which the "error" introduced by printing one pixel in a particular color that differs from the color theoretically required at that pixel is distributed among neighboring pixels so that overall the correct color sensation is produced) can be employed with limited palette displays. There is an enormous literature on error diffusion; for a review see Pappas, Thrasyvoulos N. "Model-based halftoning of color images," *IEEE Transactions on Image Processing* 6.7 (1997): 1014-1024. Use of dithering in color electrophoretic displays is known in the art; see, e.g., U.S. Pat. No. 11,869,451, which is incorporated by reference herein in its entirety.

Grayscale Replacement in Color Electrophoretic Displays

Figure 6A:
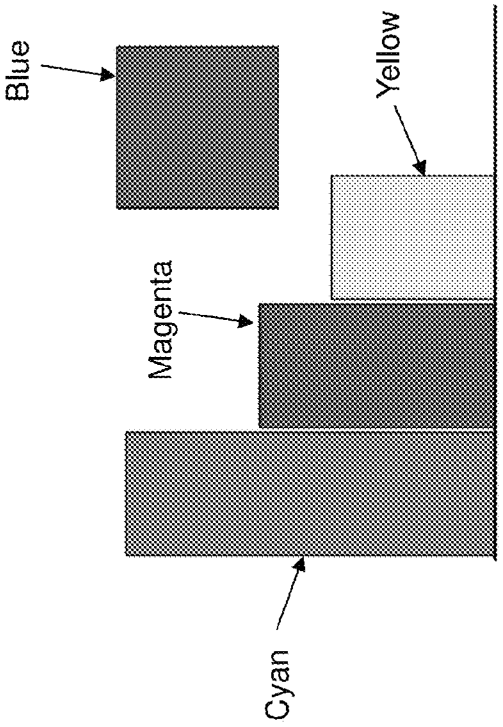
FIGS. 6A-6D are simplified diagrams illustrating basic principle of GCR for a blue color.
Figure 6B:
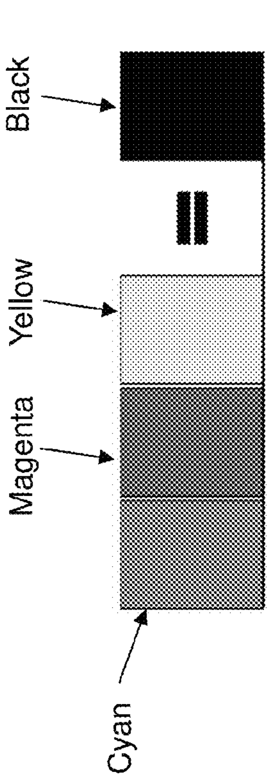
Figure 6C:
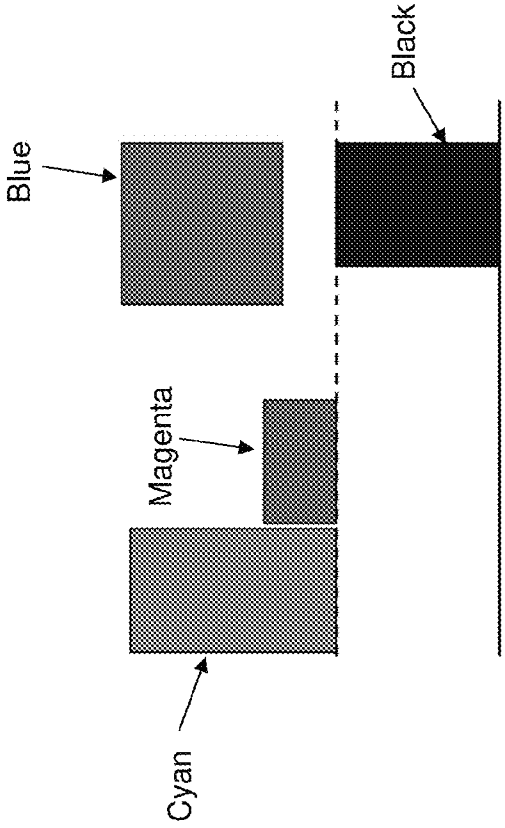
Figure 6D:
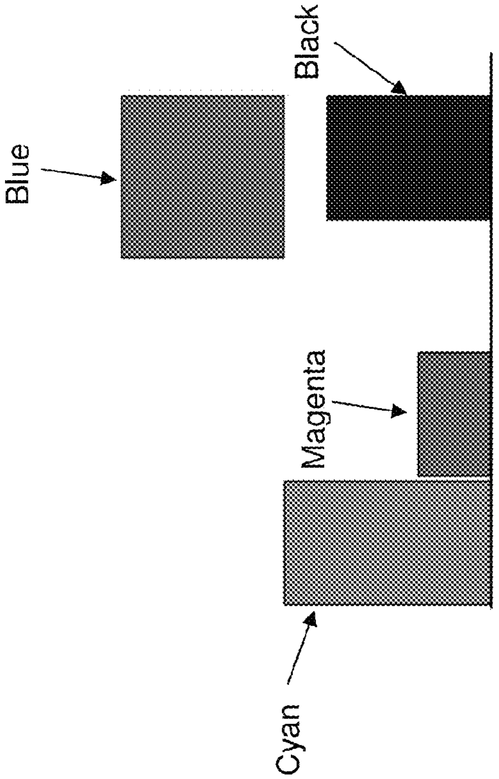

The printing industry has long used the GCR methods to replace some or all of the cyan, magenta, and yellow (CMY) inks in built colors with black. The amount of amount of cyan, magenta, and yellow that equals black at different tone levels is referred to as the gray component. The primary motivation is that black ink is less expensive than the respective combined amounts of cyan, magenta, and yellow inks. This concept is illustrated in the simplified drawings of FIG. 6A-6D. FIG. 6A shows some amount of cyan, magenta, and yellow ink needed to make a blue color. Assume that equal parts of cyan, magenta, and yellow can be replaced by a respective amount of black as depicted in FIG. 6B. The amount of cyan, magenta, and yellow equal to the minimum amount of the three colors is replaced with black as shown in FIG. 6C. FIG. 6D shows how the same blue color is now made from a lesser amount of cyan and magenta, with black.

Figure 7A:
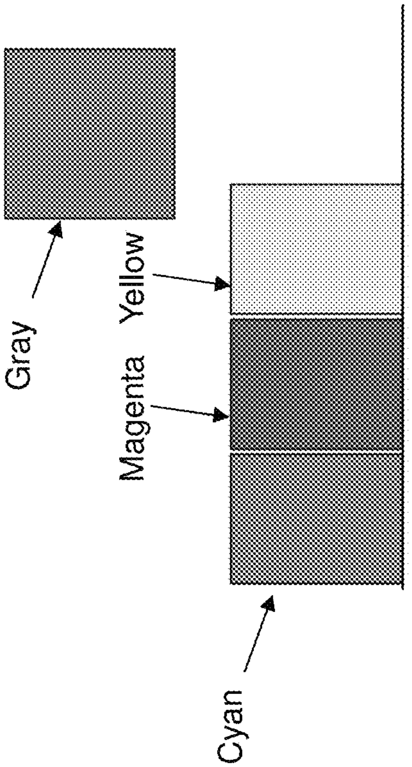
FIGS. 7A and 7B are simplified diagrams illustrating basic principle of GCR for a neutral color.
Figure 7B:
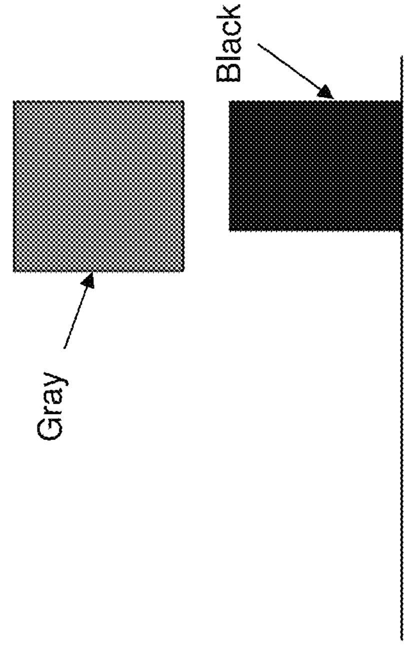

In other cases, pure neutral colors built with cyan, magenta, and yellow, may be replaced entirely by black ink, as shown in FIGS. 7A and 7B. FIG. 7A shows how an equal amount of cyan, magenta, and yellow ink can make a gray. FIG. 7B depicts the same gray printed with only black ink.

Applying GCR concepts to electrophoretic devices requires a somewhat different process than the GCR method described above. It may be advantageous to include additional gray tones in the color dithering process to decrease the size of the dithering tetrahedra and make the tetrahedra vertices closer together in the color space. However, that process would not replace cyan, magenta, and yellow equivalents with gray, only dither gray alongside cyan, magenta, and yellow, as well as red, green, and blue. In applying GCR processes to electrophoretic devices, methods in accordance with various embodiments replace neutral areas dithered using some combination of the color palette primaries (typically, but not limited to, cyan, magenta, yellow red, green, blue, white, and black) with dither patterns containing only black, white, and a plurality of grays (typically, but not limited to, two grays).

Figure 8A:
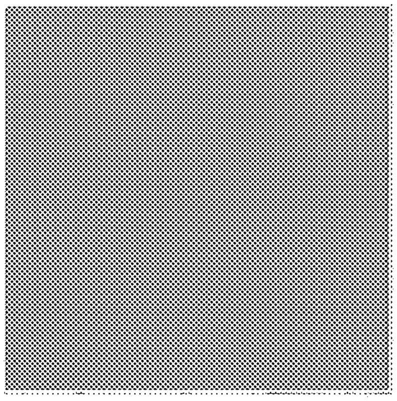
FIGS. 8A and 8B show a uniform gray source image and a dithered uniform gray image, respectively, demonstrating how dithering can be used to successfully render uniform areas.
Figure 8B:
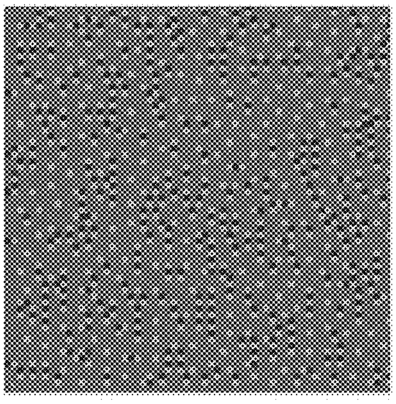
Figure 9A:
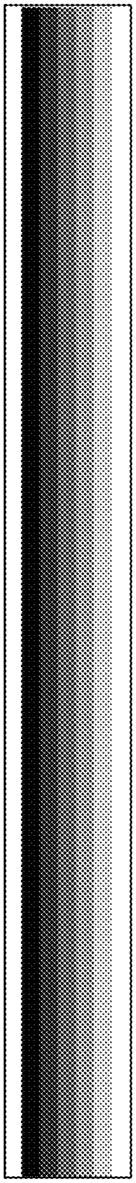
FIGS. 9A and 9B show a single-pixel gray line source image and a dithered single-pixel gray line image, respectively, demonstrating the difficulty in rendering fine details using a common electrophoretic dithering method.
Figure 9B:
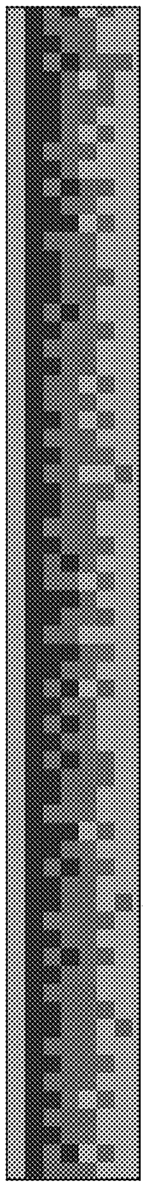

In many current electrophoretic display device renderings, any RGB value/region not exactly [0 0 0] or [1 1 1] is dithered using black or white plus colored primaries. This is satisfactory for large areas where the human visual system is able to average over that area to create the sensation of a patch of uniform color, as illustrated in FIGS. 8A and 8B. FIG. 8A shows a uniform gray source image at 1200% zoom, and FIG. 8B shows a dithered uniform gray image also at 1200% zoom. FIG. 8B demonstrates how dithering can be used in successfully rendering uniform areas. However, displayed text and thin lines have very noticeable defects since there is not enough area to visually average groups of colored pixels as illustrated in FIGS. 9A and 9B. FIG. 9A shows a black and white source image with single-pixel lines of values (from top to bottom) of 0, 50, 100, 150, and 200 (at 1200% zoom). FIG. 9B shows a dithered rendering of the black and white source image using the mask-method also at 1200% zoom. FIG. 9B demonstrates the difficulty in rendering fine details using dithering in electrophoretic displays. It shows that the small details cannot be resolved amid the dithering noise. A need thus exists for reducing defects in high-frequency areas in electrophoretic displays resulting from color dithering.

One aspect of the invention relates to a process for gray component replacement in color electrophoretic display renderings. The process merges a dithered color image with a dithered black and white version of the same image by replacing the neutral portions of the dithered color image with corresponding portions of the dithered black and white image. The end result is an image in which fine neutral details, such as black and gray lines and text, are rendered using only neutral primaries with lower contrast between groups of dithered primaries. This makes dithering patterns less visible and makes black and white regions appear smoother, increasing the resolution of fine details. In one or more embodiments, black is dithered with gray 1, and white is dithered with gray 2. As with standard color dithering, a lookup table (LUT) can be used to transform RGB to the black and white dithering matrix.

Figure 10:
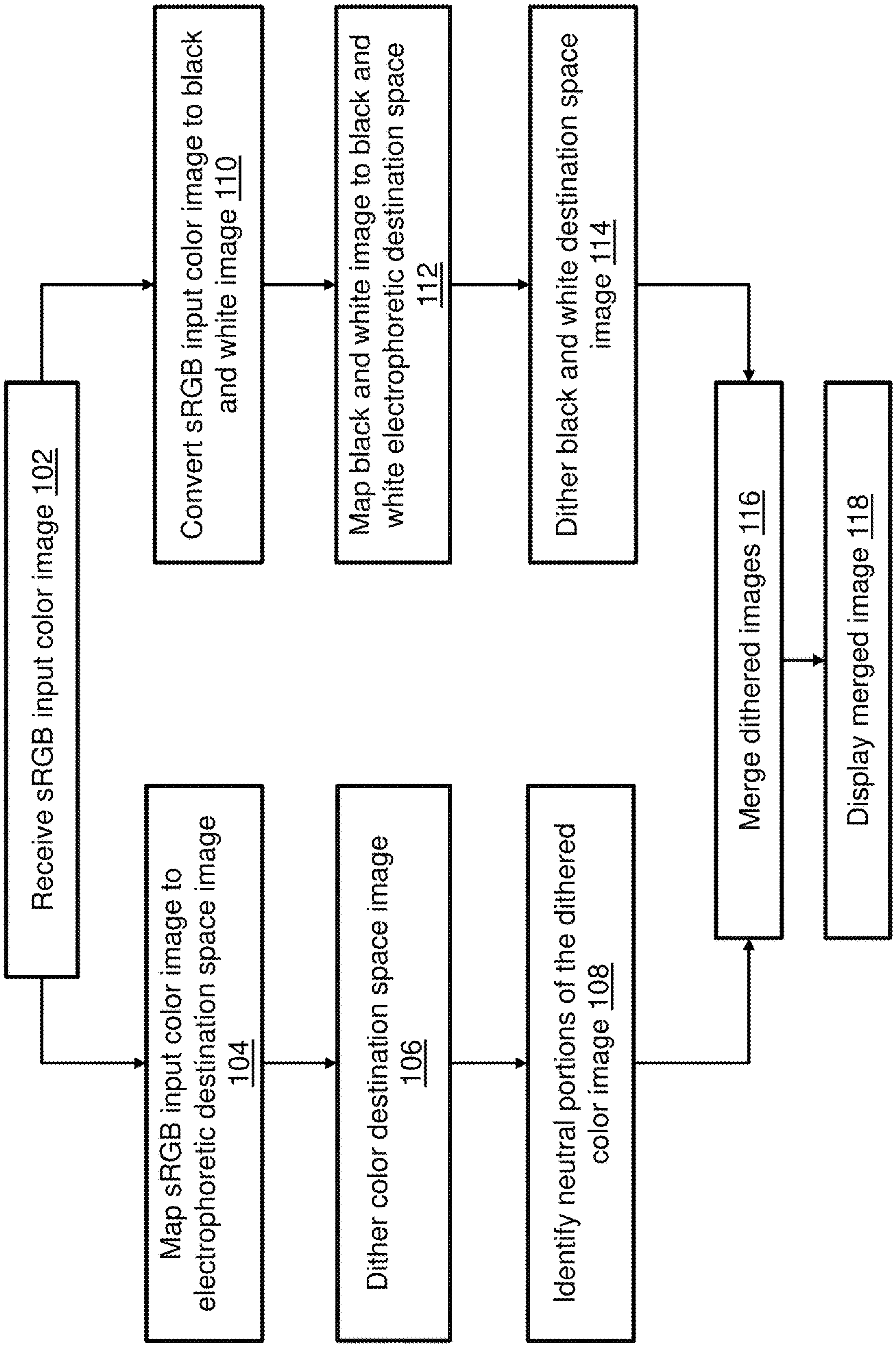
FIG. 10 is a flowchart illustrating an exemplary process for to gray component replacement in images to be displayed on color electrophoretic display devices according to one aspect of the invention.

FIG. 10 is a flowchart generally illustrating an exemplary gray component replacement process for color electrophoretic displays in accordance with one aspect of the invention. The steps of the process can be performed by a device processor such as, e.g., the processor 50 previously discussed above in connection with FIG. 3B.

At step 102 of the process, an input color image to be displayed on an electrophoretic device is received by the device processor. The image is in an RGB format.

The RGB input color image is mapped to an electrophoretic destination space defined by an electrophoretic color gamut to generate a color destination space image at step 104.

The color destination space image is dithered at step 106 to generate a dithered color image.

At step 108, neutral portions of the dithered color image are identified.

The RGB input color image is also converted to a black and white image at step 110.

The black and white image is mapped to a black and white electrophoretic destination space defined by electrophoretic black, white, and a plurality (e.g., two) of gray primaries to generate a black and white destination space image at step 112.

The black and white destination space image is dithered using the four neutral primaries at step 114 to generate a dithered black and white image.

The dithered color image and the dithered black and white image are merged at step 116 by replacing the neutral portions of the dithered color image identified in step 108 with corresponding portions of the dithered black and white image to generate a merged color image.

The merged color image is then displayed on the electrophoretic display at step 118. For example, the device processor 50 instructs the device controller 60 to cause the electrophoretic display module 55 to display the merged color image.

The source RGB image can be converted to black and white (step 110) using one of a number of known methods for converting RGB images to black and white images. One such method utilizes the weighted addition of red, green, and blue channels. The green channel is typically weighted higher than the red and blue channels, as indicated in Eq. 1 below (which provides an approximation of luminance), because the green channel most closely represents the visual luminous efficiency function. However, the specific weights can be varied.

$$I_{BW} = 0.2126 * R_{x,y} + 0.7152 * G_{x,y} + 0.0722 * B_{x,y} \tag{1}$$

Figure 11B:
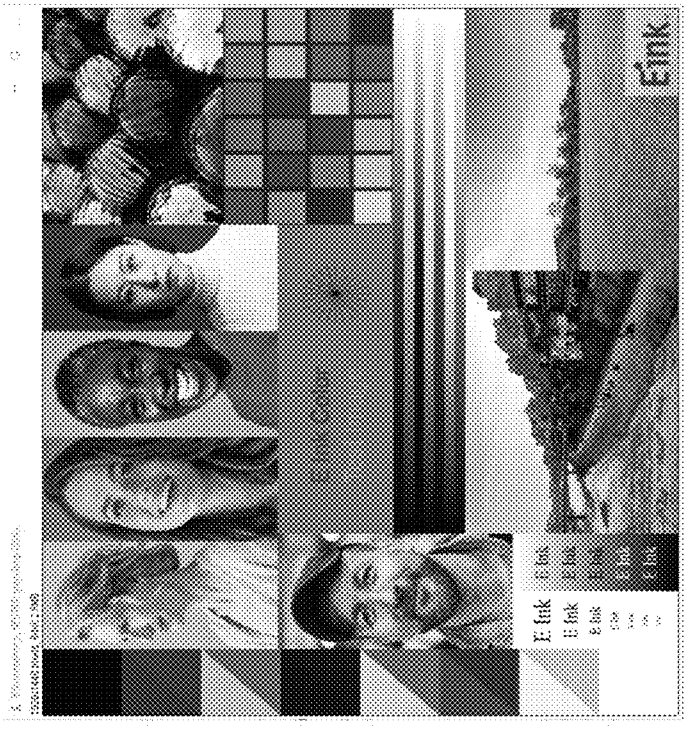
FIGS. 11A and 11B show an exemplary test source image in its original RGB format and calculated black and white format, respectively.
Figure 11A:
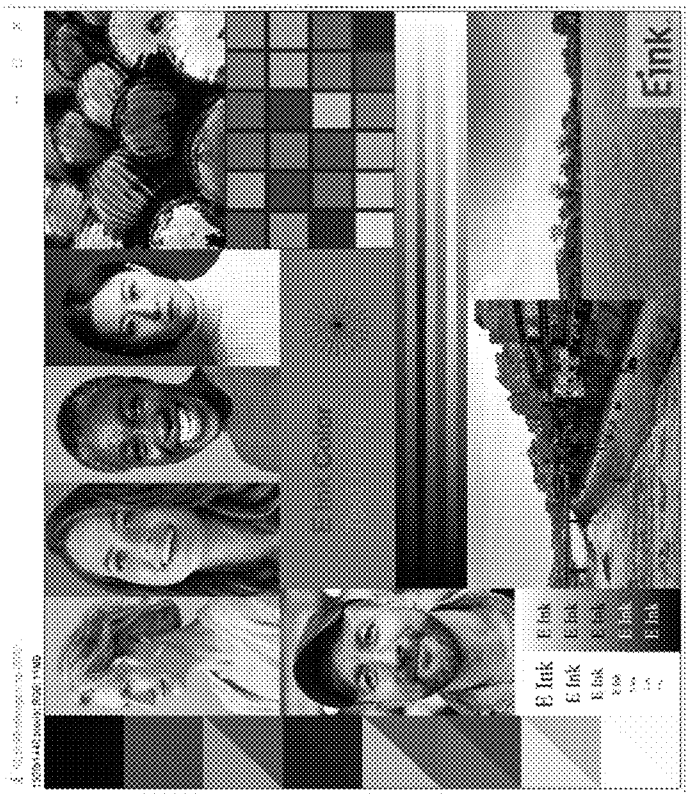

FIGS. 11A and 11B show an example source test image its original RGB format and the calculated black and white format determined using Eq. 1.

Figure 12:
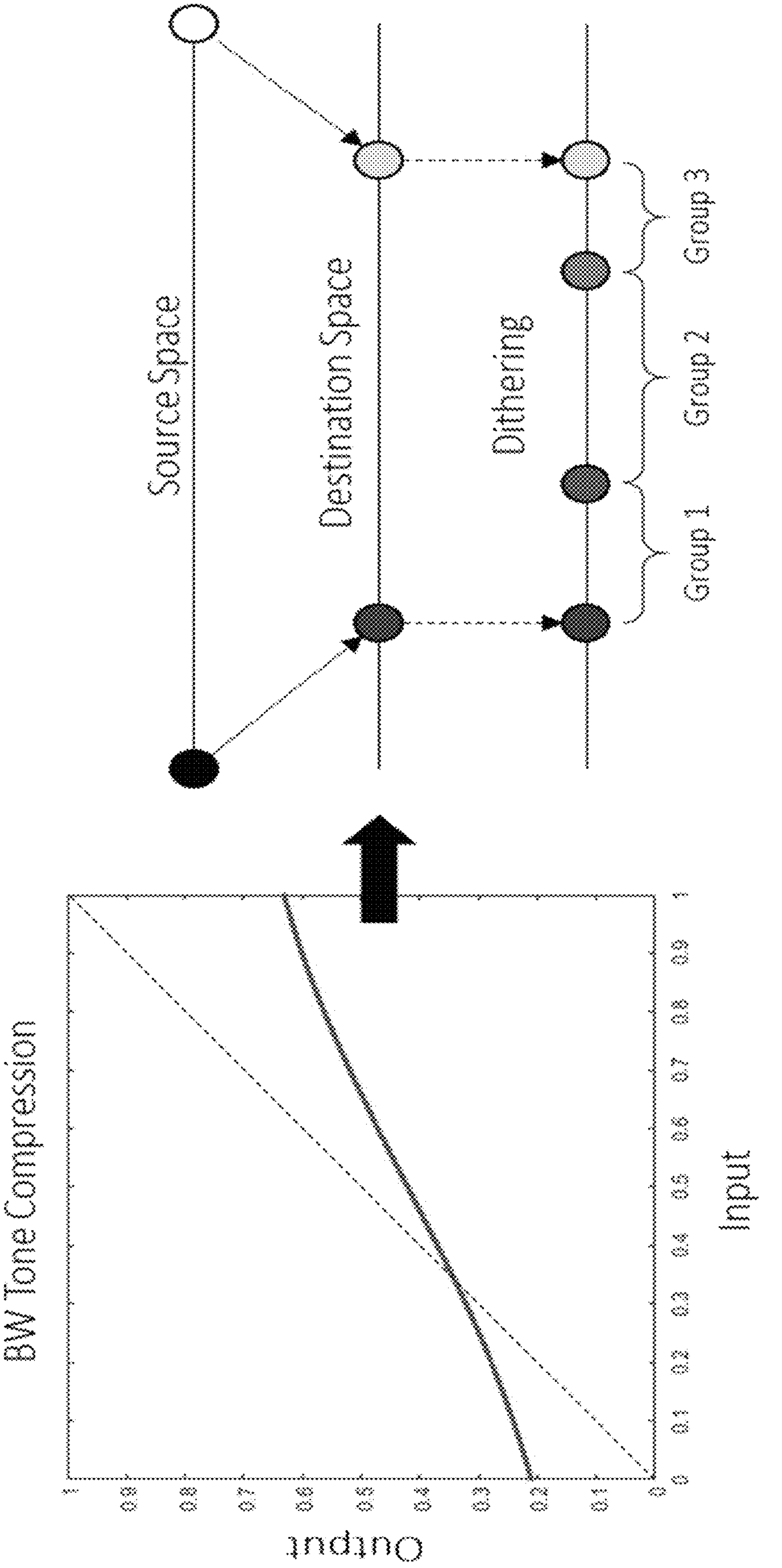
FIG. 12 is a graph showing addition of sigmoidal contrast enhancement during the compression from Input RGB values to output E Ink destination RGB values.

The black and white image is mapped from the source to destination space (step 112) only along the luminance dimension since there is no color information. The source RGB values, in the range [0, 1], are scaled down to the maximum digital values of the destination space, about [0.2, 0.6], depending on the specific display unit. A sigmoidal contrast enhancement can be added to compensate for the reduced dynamic range. This tonal compression with sigmoidal enhancement is illustrated in the graph shown in FIG. 12.

The black and white pixel value range is divided by the pixel values of the plurality of N gray primaries, where Gray 1 and Gray N are the black and white primaries, respectively, from the set of color primaries. There are N−1 sequential pairs of gray primaries ([1, 2], [2, 3], . . . [N−1, N]). Image pixel values are sorted into the N−1 groups based on the bounding pixel values in each group and are then dithered using a combination of the two gray pixel values in that group. For example, if Gray 2 has a pixel value of 0.2 and Gray 3 has a pixel value of 0.4, then all image pixel values in the range [0.2, 0.4] will be dithered using Gray 2 and Gray 3. The amount of each Gray primary used in the dithering pattern can be determined using a barycentric mapping with the following equation.

$$\begin{bmatrix} \alpha_{i,1} & \dots & \alpha_{i,M} \\ \alpha_{j,1} & \dots & \alpha_{j,M} \end{bmatrix} = \begin{bmatrix} 1 & 1 \\ p_i & p_j \end{bmatrix}^{-1} \begin{bmatrix} 1 & \dots & 1 \\ I_{[i,j],1} & \dots & I_{[i,j],M} \end{bmatrix} \tag{2}$$

where 1≤i<j≤N for N Gray primaries, $\alpha_i$ and $\alpha_j$ are the barycentric coordinates for Gray primaries i and j, and $I_{[i,j],M}$ are the image pixel values for the for M pixels in group [i, j].

Figure 13B:
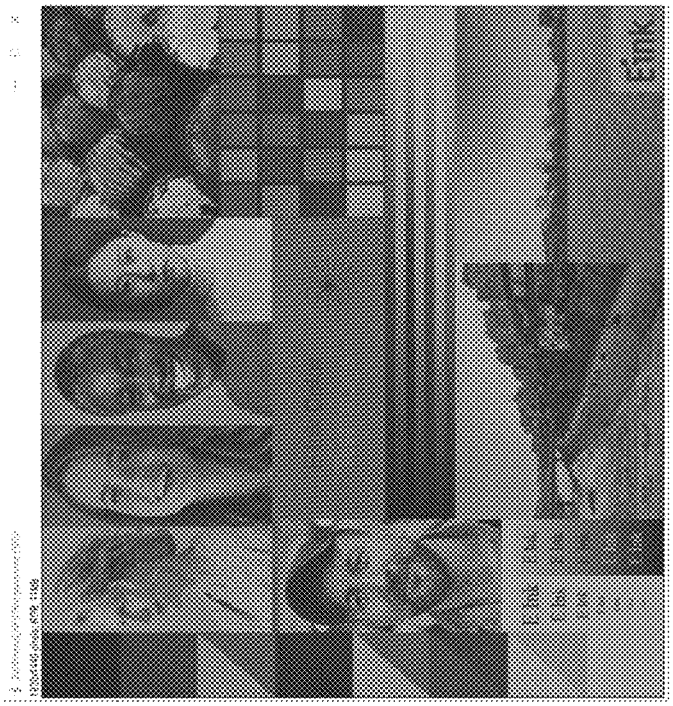
FIGS. 13A and 13B show dithered renderings of the test image in the color destination-space and the black and white destination-space, respectively.
Figure 13A:

After calculating the barycentric coordinates, a black and white dither pattern for the image is computed using a threshold mask or a dither mask, which may include blue-noise masks, Bayer masks, or similar masks used for dithering. A blue-noise mask (BNM) is disclosed, e.g., in U.S. Pat. No. 11,527,216, which is incorporated by reference herein in its entirety. FIGS. 13A and 13B show dithered renderings of the color destination-space and the black and white destination-space images, respectively.

The dithered color and black and white destination-space images are merged at step 116. The merge process begins with the dithered color image, where each pixel is represented by a single color primary. Those pixels in areas of the color image where there is little color information, a.k.a. "neutral" areas, are replaced by respective pixels from the dithered black and white image. Identifying the neutral portions of the dithered color image (step 108) includes determining the degree of neutrality (DoN) for each pixel in the dithered color image. Then a neutrality threshold is set. Pixels with a degree of neutrality greater than the threshold are selected for replacement with black and white pixels. The DoN may be calculated using one of a plurality of known methods, including but not limited to (1) RGB ratio method, (2) neighborhood RGB ratio method, and (3) uniform color space chroma method discussed in further detail below.

RGB Ratio Method

The RGB ratio is calculated using the source RGB image to identify black and white and color areas. Each color pixel is defined by a vector, [R, G, B], of red, green, and blue pixel values. The difference between the minimum and maximum values in [R, G, B] approaches zero with maximum neutrality, and approaches 1 with minimum neutrality. The RGB Ratio metric, $\rho_{i,j}$, in Eq. 3, is computed for each color pixel value, (i, j).

$$\rho_{i,j} = \left(1 - \frac{\max([R_{i,j}, G_{i,j}, B_{i,j}]) - \min([R_{i,j}, G_{i,j}, B_{i,j}])}{255}\right)^{\gamma} \tag{3}$$

Figure 14B:
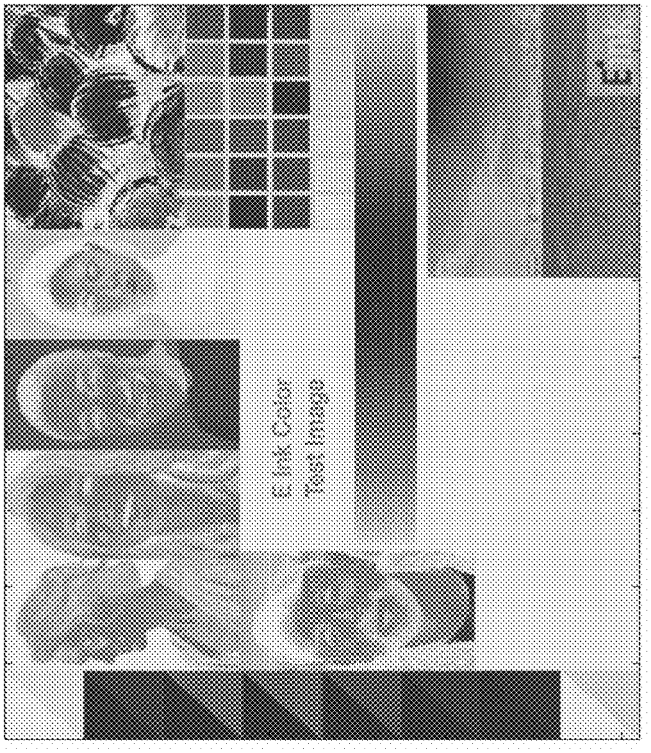
FIGS. 14A and 14B show image maps used for determining the degree of neutrality using the RGB ratio method.
Figure 14A:
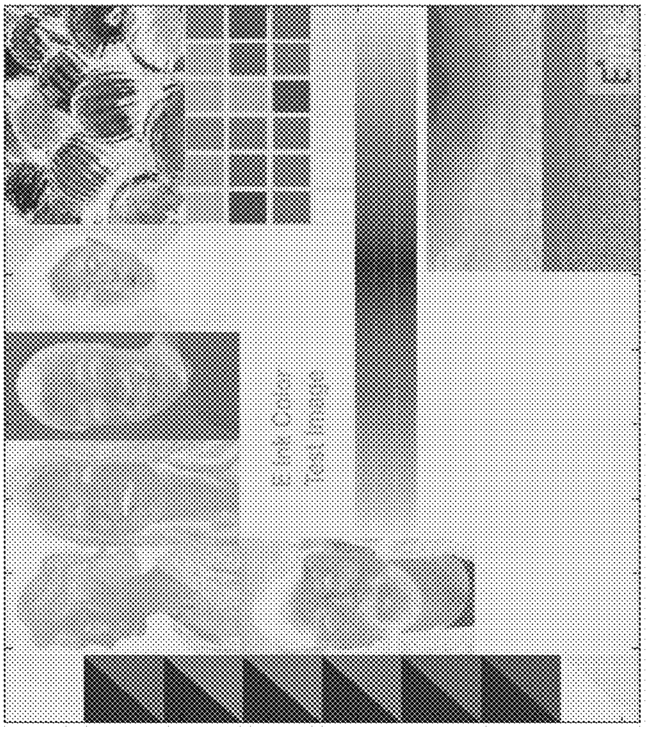

The exponent, $\gamma$, with values ideally in the range, but not constrained to, [1.5, 1.8] gives greater discrimination between neutral and non-neutral areas. Image maps of $\rho$ with $\gamma$=1 and $\gamma$=1.5 are shown in FIGS. 14A and 14B, respectively, where regions approaching yellow (having a higher RGB ratio) are more neutral, and regions approaching blue are less neutral. The map with $\gamma$=1.5 (FIG. 14B) has more blue regions, thus determining a smaller number of pixels as neutral.

Figure 16:
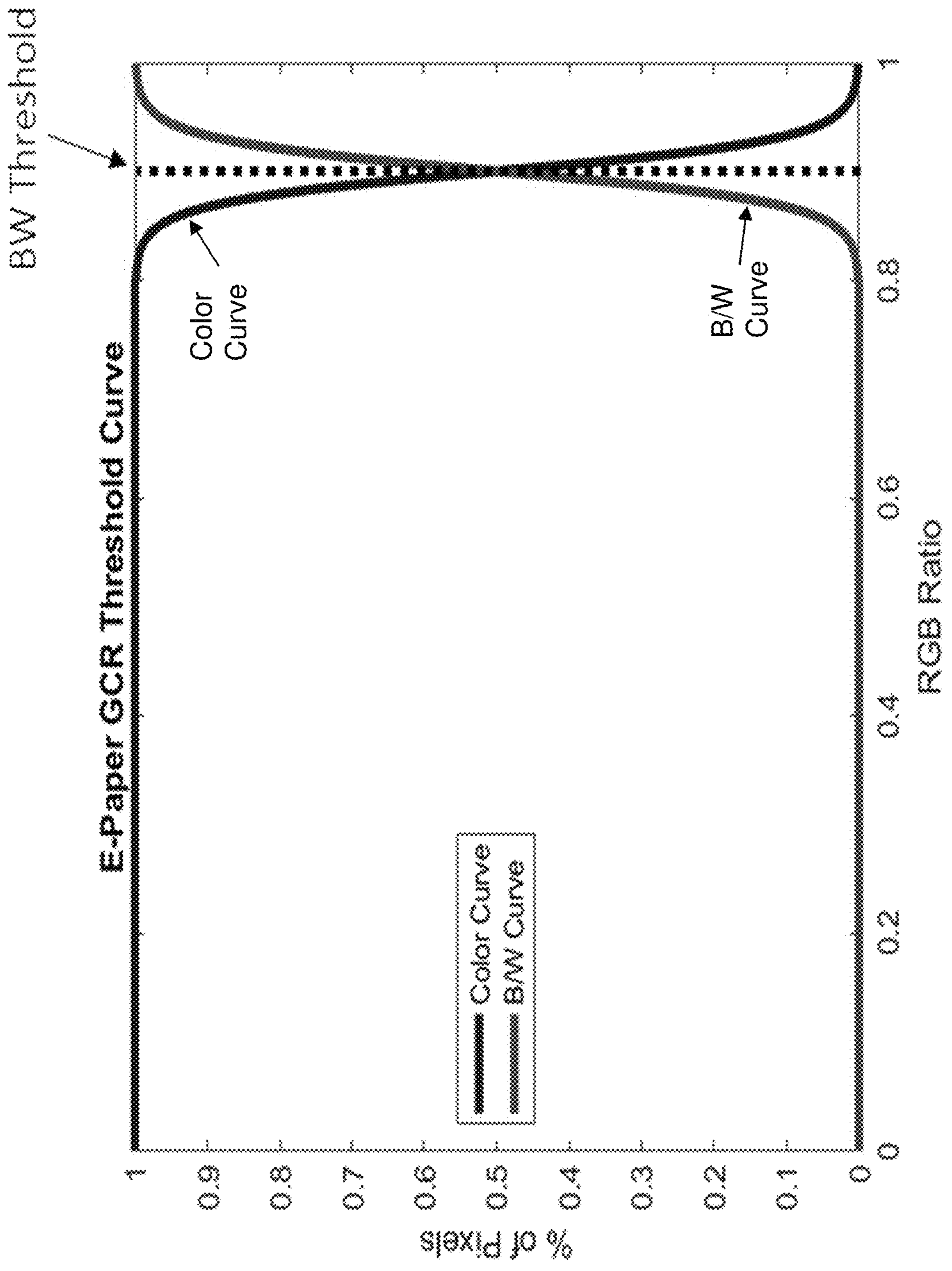
FIG. 16 is a graph showing Sigmoidal color likelihood and black and white likelihood functions.

A BNM (or other threshold or dither mask) is used to dither regions in which there is a transition between color and black and white pixels. This avoids edges, which may show as artifacts if there is inconsistent color rendering in the displayed image. First, a threshold, $\rho_T$, is defined. The default value for $\rho_T$=0.90. The input to the BNM is a function that defines the likelihood a pixel will be classified as black and white. This function has a sigmoidal shape, with a domain between 0 and 1, where 1 is definitely black and white, and 0 is definitely color, and a median value equal to $\rho_T$. The likelihood function is calculated using a MATLAB function, LikelihoodColorCurve, shown as Selection 1 (FIG. 15). (MATLAB 2022, version R2022a available from The Math Works Inc.). The inputs are $\rho_T$ ("RhoT") and $\rho_M$, the RGB Ratio values for the image ("ImageRGBRatio"). The function outputs the likelihoods pixels in the image are color ("ColorOut") and the likelihoods pixels in the image are black and white ("black and whiteOut"), the latter of which is the input to the BNM. The sigmoidal color likelihood functions and black and white likelihood functions are shown in FIG. 16.

A binary image, in which values of 1 are color pixels and value of 0 are black and white pixels, called the Threshold Mask is created by dithering the black and whiteOut values using the BNM, similar to the method disclosed in U.S. Pat. No. 11,527,216, which is incorporated by reference herein in its entirety. The BNM is a 64×64 matrix with 4096 values between 0 and 1 strategically placed such that sequential values are not in close proximity. The BNM is tessellated across the area of the image such that a new BNM has the same dimensions as the image. For a given pixel in the, BNM, $BNM_{(i,j)}$, and in black and whiteOut, $BNM_{(i,j)}$, if black and $whiteOut_{(i,j)}>BNM_{(i,j)}$, then the merged image pixel $I_{(i,j)}$ will use the respective pixel from the dithered black and white image (FIG. 13B). Otherwise, $I_{(i,j)}$ will use the respective pixel from the dithered color image (FIG. 13A).

Figure 17B:
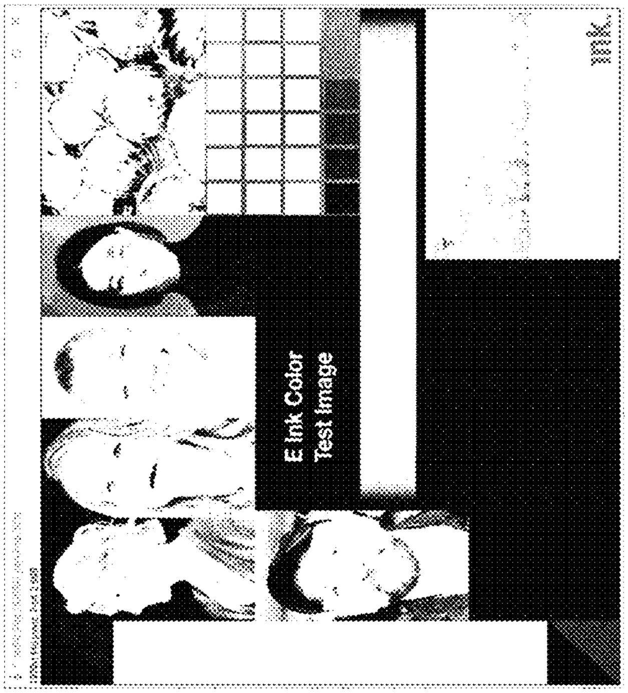
FIGS. 17A and 17B show threshold mask images with $\gamma=1$ and $\gamma=1.5$, respectively.
Figure 17A:
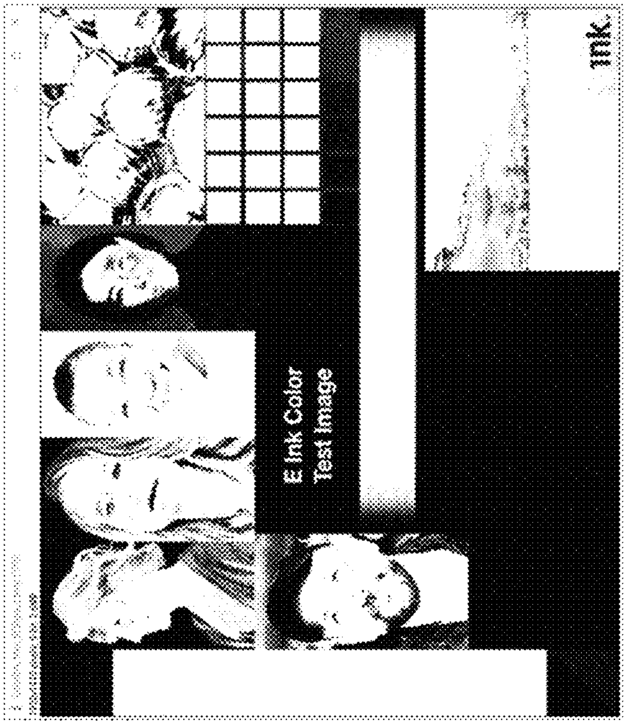

The Threshold Mask images, with $\gamma$=1, and $\gamma$=1.5 are shown in FIG. 17. White areas represent color pixels and black areas represent black and white pixels.

Figure 18:
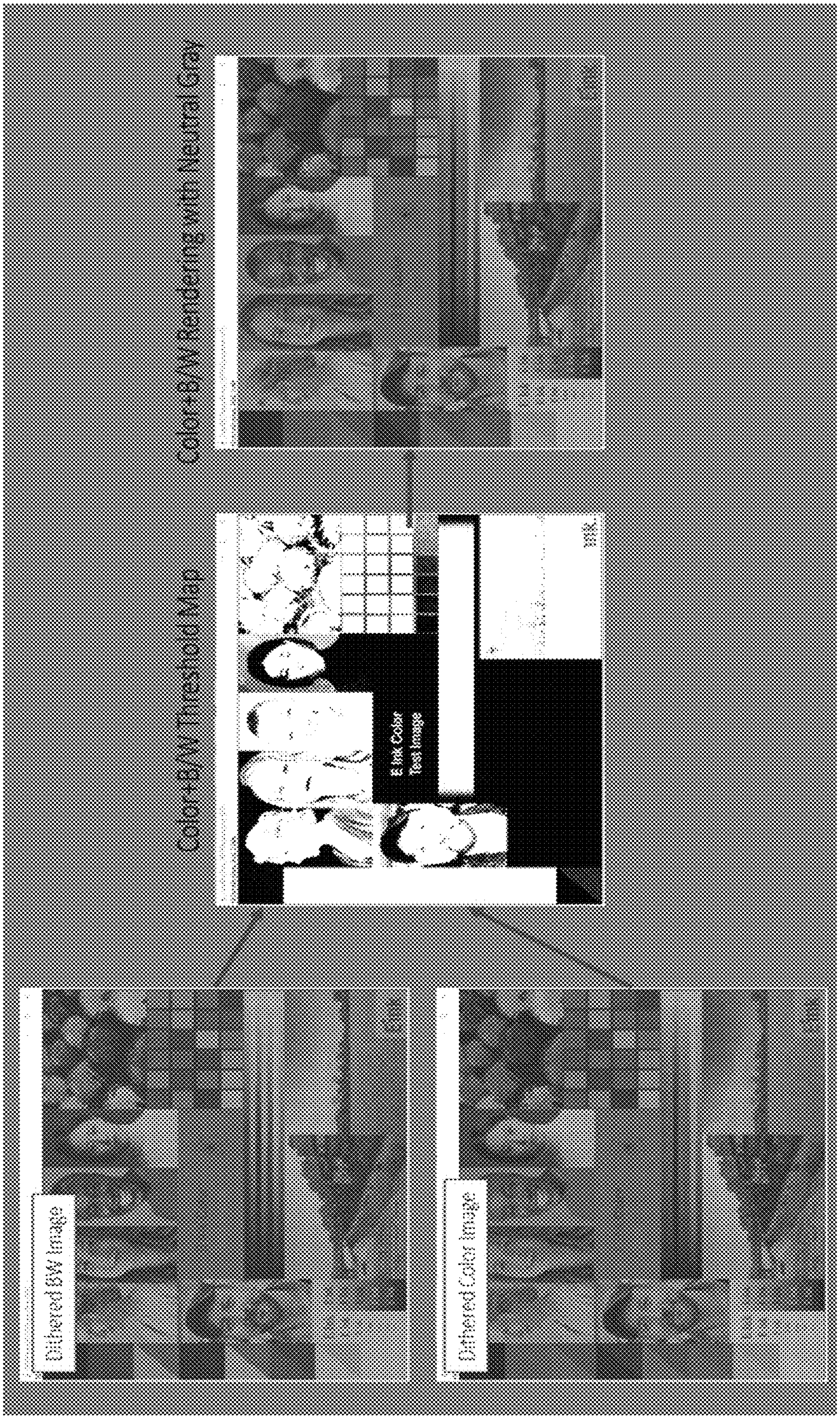
FIG. 18 illustrates an exemplary process of merging dithered black and white and dithered color test images.

FIG. 18 depicts the workflow for merging the dithered black and white and dithered color images.

Neighborhood RGB Ratio Method

The neighborhood RGB ratio method is an alternative to the RGB ratio method discussed above for merging color and black and white dithered images. Rather than using a $\gamma$ to reduce the use of black and white pixels in color areas, a smoothing kernel, K, can be used to smooth $\rho_{i,j}$ by convolving the image with K. The value $\gamma$ may be, but is not limited to, 1 in this application.

$$\rho_{N,(i,j)} = conv(K, \rho_{i,j}) \tag{4}$$

One potential drawback to this method is that it may create artifacts in areas where there are gradual changes from color to black and white, such as transitioning from a color gradient to a neutral gradient. One option, rather than using a convolution kernel, is to use an edge-preserving filter, such as a bilateral filter. However, edge-preserving filters were designed for noise-reduction, not blurring, and so may have a minimal effect and not provide needed reduction in black and white dithering in colored areas.

Uniform Color Space Chroma Method

The RGB ratio method and the neighborhood RGB ratio method make neutrality decisions based on device-dependent RGB values. Alternatively, neutrality decisions can be made by converting the image RGB values to one of a plurality of device-independent uniform color spaces including, but not limited to: CIE L*a*b*, IPT, CIECAM02 UCS, CAM16-UCS. (CIECAM02 UCS is described in Moroney, Nathan; Fairchild, Mark; Hunt, Robert; and Li, Changjun, "The CIECAM02 color appearance model" (2002). CAM16-UCS is described in Li C, Li Z, Wang Z, et al. Comprehensive color solutions: CAM16, CAT16, and CAM16-UCS. Color Res Appl. 017; 42:703-718. Https://doi.org/10.1002/col.2213.)

The chroma values in each of these spaces indicate the level of neutrality, where 0 is perfectly neutral and increasing values are more chromatic. An example flow from RGB to CIELAB C* is RGB→CIE XYZ→CIE L*a*b*→C*. The C* values can then be used to generate a Threshold Mask and dither the images. The advantages of using RGB over a UCS is that the values are linear and bounded between 0 and 1. However, the UCS method provides a more perceptually uniform mapping, so there is less likelihood that color pixels are rendered using black and white, if the threshold is set properly.

Examples

Various examples discussed below compare image renderings using only color palette primaries and using merged color and black and white primaries generated using the processes disclosed above. In general, it has been found that the original dithered color image and merged color and black and white image look similar if the color of the middle gray primaries falls inline between the white and black primaries. Tinting of the gray tones, however, may lead to less pleasing color, depending on how far the middle grays deviate from the trace between black and white.

Figures 19A, 19B:
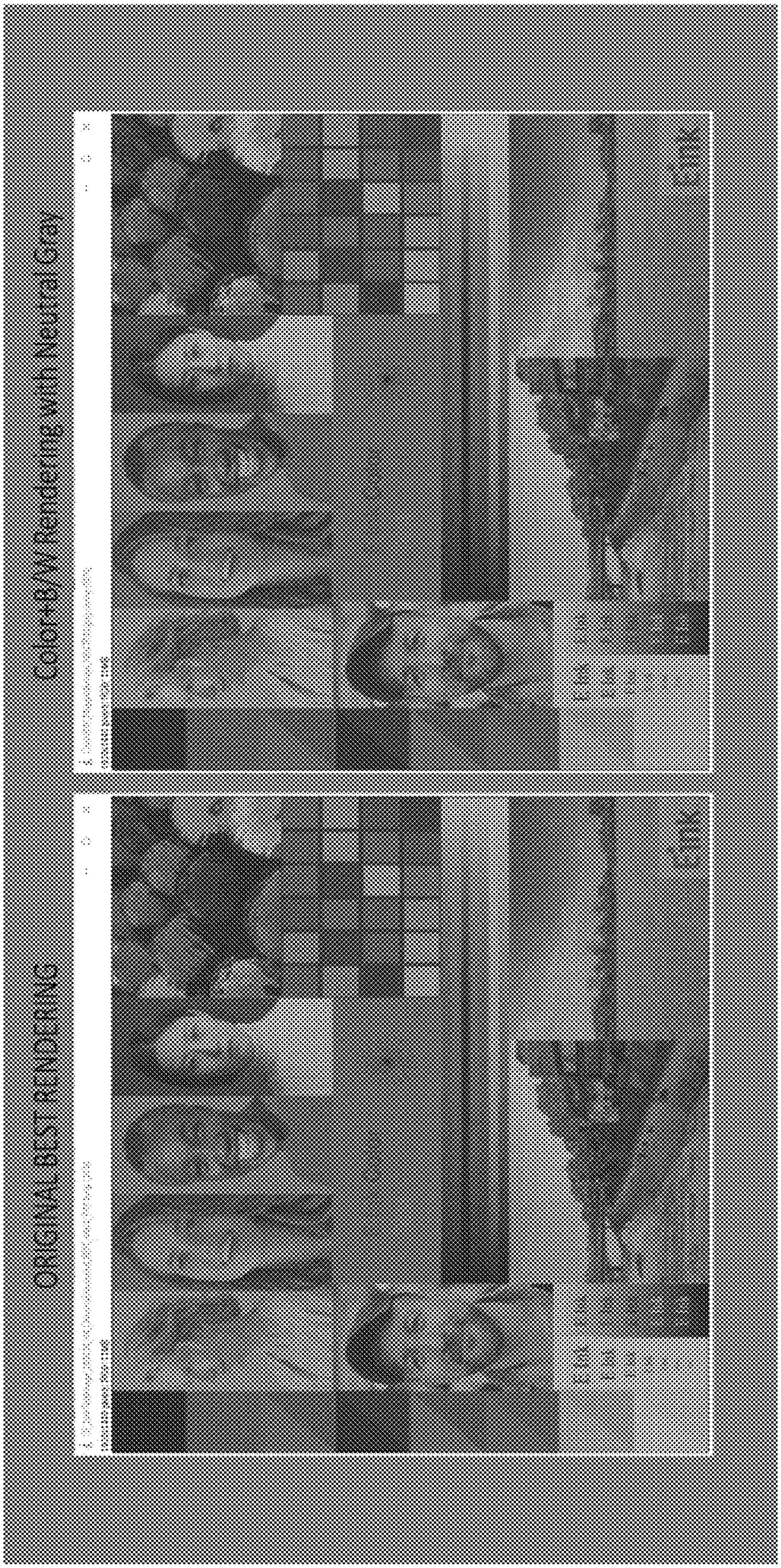
FIGS. 19A and 19B show the test image rendered using only color palette primaries and using color and black and white primaries, respectively.

FIGS. 19A and 19B show the test image rendered using only color palette primaries and using merged color and black and white primaries, respectively.

Figure 20A:
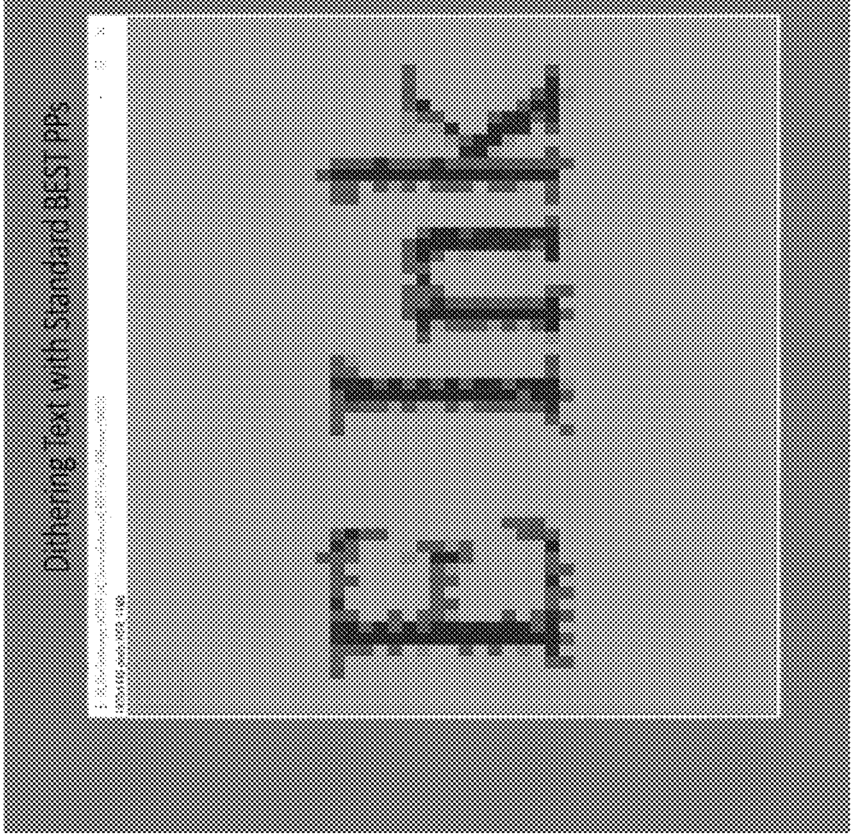
FIGS. 20A and 20B show close-up views of text rendered using only color palette primaries and using color and black and white primaries, respectively.
Figure 20B:
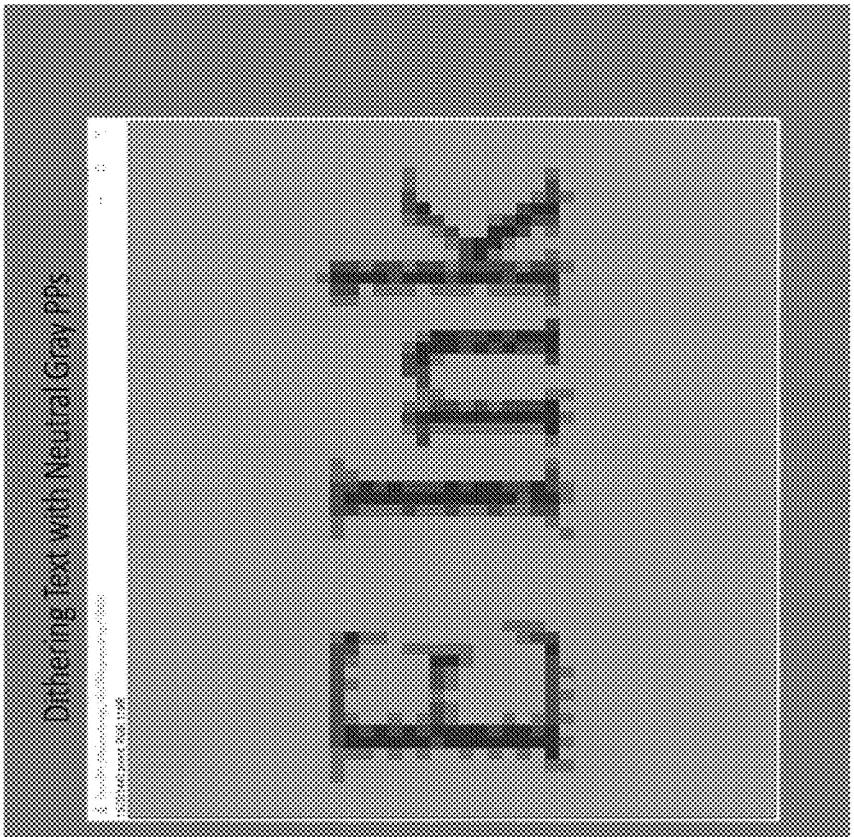

FIGS. 20A and 20B are close-up views of text in the images of FIGS. 19A and 19B, respectively.

Figures 21A, 21B:
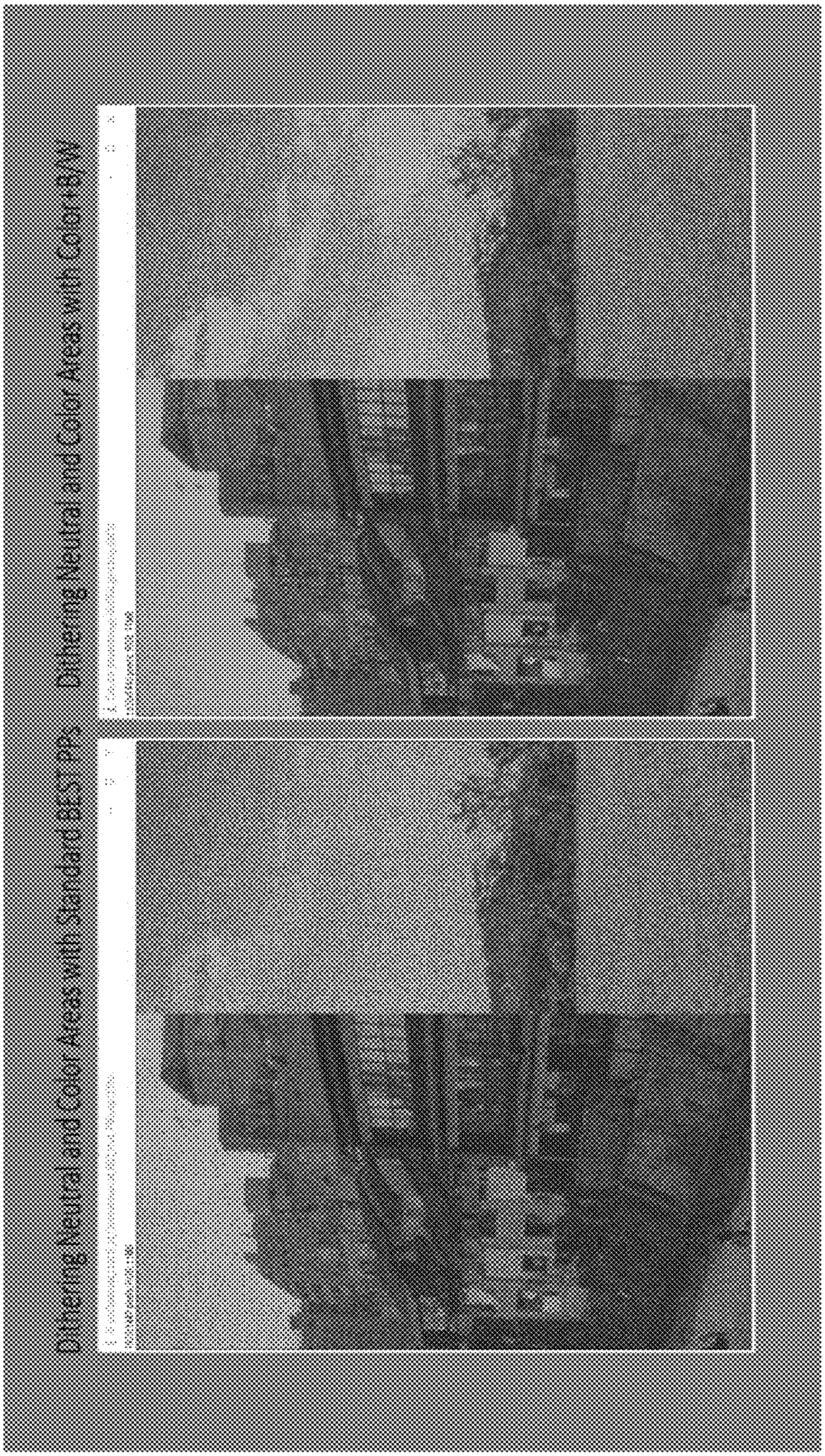
FIGS. 21A and 21B show close-up views of an area of the test image that includes both a black and white image and color image rendered using only color palette primaries and using color and black and white primaries, respectively.

FIGS. 21A and 21B are close-up views of an area of the images of FIGS. 19A and 19B, respectively, that includes both black and white and color elements.

Figures 22A, 22B:
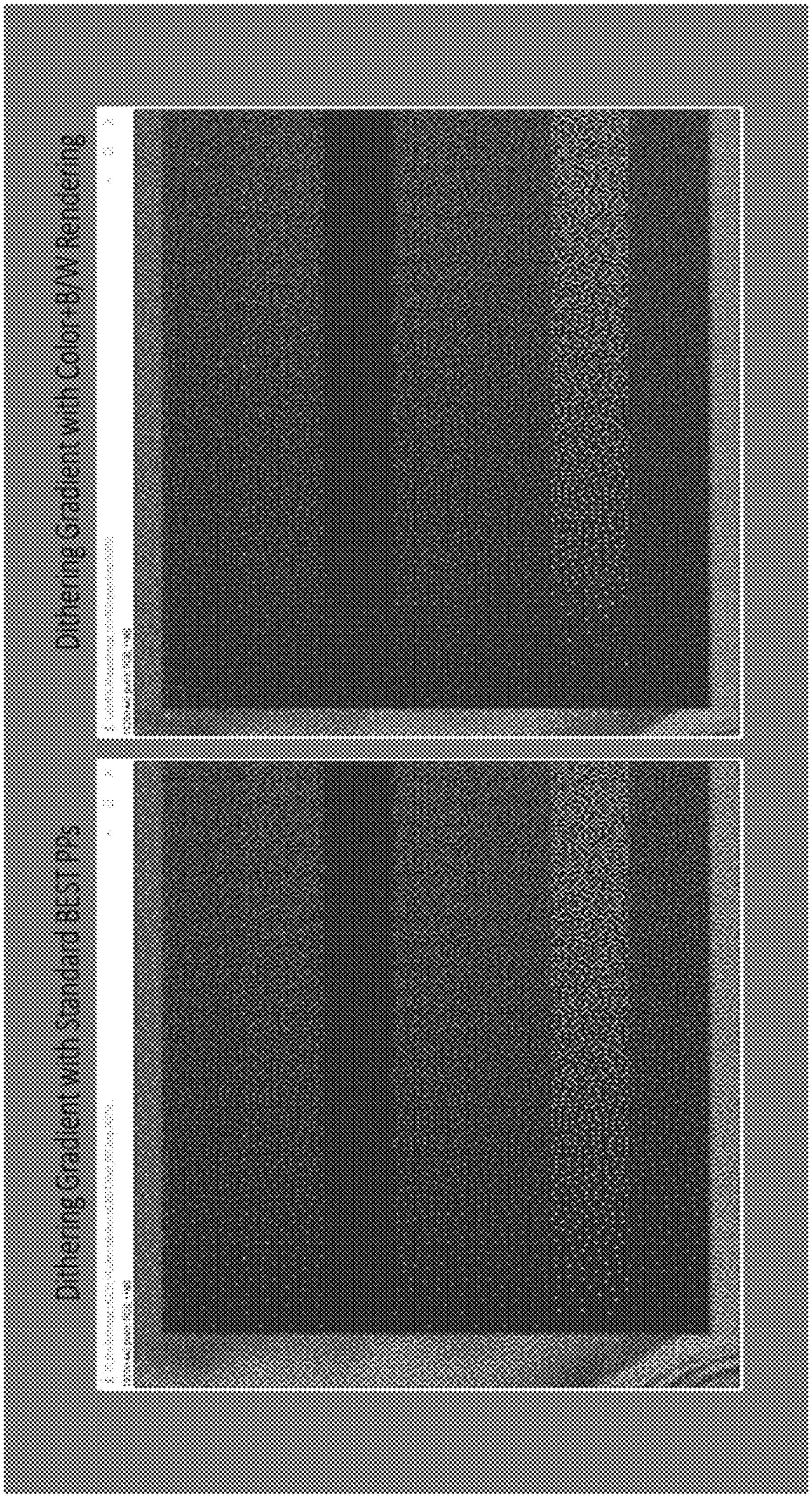
FIGS. 22A and 22B show close-up views of a shadow gradient area of the test image rendered using only color palette primaries and using color and black and white primaries, respectively.

FIGS. 22A and 22B are close-up views of a shadow gradient area of the images of FIGS. 19A and 19B, respectively.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A method of driving a color electrophoretic display, comprising:

(a) receiving a red-green-blue (RGB) input color image;

(b) mapping the RGB input color image to an electrophoretic destination space defined by an electrophoretic color gamut to generate a color destination space image;

(c) dithering the color destination space image to generate a dithered color image;

(d) identifying neutral portions of the dithered color image;

(e) converting the RGB input color image to a black and white image;

(f) mapping the black and white image to a black and white electrophoretic destination space to generate a black and white destination space image;

(g) dithering the black and white destination space image to generate a dithered black and white image;

(h) merging the dithered color image and the dithered black and white image by replacing the neutral portions of the dithered color image with corresponding portions of the dithered black and white image to generate a merged color image; and (i) displaying the merged color image on the electrophoretic display.

2. The method of claim 1, wherein the black and white electrophoretic destination space is defined by black, white, and a plurality of gray colors.

3. The method of claim 1, further comprising performing sigmoidal contrast enhancement of the black and white destination space image in step (f) to compensate for reduced dynamic range.

4. The method of claim 1, wherein the color destination space image and the black and white destination space image are dithered using a threshold mask or a dither mask.

5. The method of claim 1, wherein the RGB input color image is converted to the black and white image in step (e) using weighted additions of red, green, and blue channels of the RGB input color image.

6. The method of claim 1, wherein identifying the neutral portions of the dithered color image comprises calculating a degree of neutrality for each pixel in the dithered color image and determining whether the degree of neutrality for each pixel meets a given threshold.

7. The method of claim 6, wherein the degree of neutrality for each pixel in the dithered color image is calculated using an RGB ratio method, a neighborhood RGB ratio method, or a uniform color space chroma method.

8. The method of claim 7, wherein the RGB ratio method comprises calculating an RGB ratio metric value for each pixel of the color image, and comparing the RGB ratio metric value to a threshold to identify neutral portions of the color image.

9. The method of claim 1, wherein the color electrophoretic display comprises a light-transmissive electrode, an active matrix of pixel electrodes, and an electrophoretic medium comprising multiple types of electrophoretic particles having different optical properties, the electrophoretic medium being disposed between the light-transmissive electrode and the active matrix of pixel electrodes, the electrophoretic display being capable of producing a plurality of primary colors at each pixel electrode.

10. The method of claim 1, wherein the color electrophoretic display includes:

a processor;

a controller coupled to the processor, and configured to provide pixel color instructions to the electrophoretic display;

a non-transitory memory coupled to the processor having a program stored therein executable by the processor for controlling operation of the electrophoretic display including performing steps (a) to (i).

11. A color display, comprising:

an electrophoretic display comprising a light-transmissive electrode, an active matrix of pixel electrodes, and an electrophoretic medium comprising multiple types of electrophoretic particles having different optical properties, the electrophoretic medium being disposed between the light-transmissive electrode and the active matrix of pixel electrodes, the electrophoretic display being capable of producing a plurality of primary colors at each pixel electrode;

a processor;

a controller coupled to the processor, and configured to provide electrophoretic display pixel color instructions to the active matrix of pixel electrodes;

a non-transitory memory coupled to the processor having a program stored therein containing a plurality of instructions which, when executed by the processor, cause the processor to:

(a) receive a red-green-blue (RGB) input color image;

(b) map the RGB input color image to an electrophoretic destination space defined by an electrophoretic color gamut to generate a color destination space image;

(c) dither the color destination space image to generate a dithered color image;

(d) identify neutral portions of the dithered color image;

(e) convert the RGB input color image to a black and white image;

(f) map the black and white image to a black and white electrophoretic destination space to generate a black and white destination space image;

(g) dither the black and white destination space image to generate a dithered black and white image;

(h) merge the dithered color image and the dithered black and white image by replacing the neutral portions of the dithered color image with corresponding portions of the dithered black and white image to generate a merged color image; and (i) instruct the controller to cause the electrophoretic medium to display the merged color image.

12. The color display of claim 11, wherein the black and white electrophoretic destination space is defined by black, white, and a plurality of gray colors.

13. The color display of claim 11, wherein the program further comprises instructions for performing sigmoidal contrast enhancement of the black and white destination space image in step (f) to compensate for reduced dynamic range.

14. The color display of claim 11, wherein the color destination space image and the black and white destination space image are dithered using a threshold mask or a dither mask.

15. The color display of claim 11, wherein the RGB input color image is converted to the black and white image in step (e) using weighted additions of red, green, and blue channels of the RGB input color image.

16. The color display of claim 11, wherein the neutral portions of the dithered color image are identified by calculating a degree of neutrality for each pixel in the dithered color image and determining whether the degree of neutrality for each pixel meets a given threshold.

17. The color display of claim 16, wherein the degree of neutrality for each pixel in the dithered color image is calculated using an RGB ratio method, a neighborhood RGB ratio method, or a uniform color space chroma method.

18. The color display of claim 17, wherein the RGB ratio method comprises calculating an RGB ratio metric value for each pixel of the color image, and comparing the RGB ratio metric values to a threshold to identify neutral portions of the color image.

19. The color display of claim 11, wherein the electrophoretic medium includes at least four types of electrophoretic particles and is capable of producing eight primary colors at each pixel electrode.

* * * * *